United States Patent
Wilzbach et al.

(10) Patent No.: US 11,835,461 B2
(45) Date of Patent: Dec. 5, 2023

(54) MICROSCOPY SYSTEM AND METHOD FOR OPERATING A MICROSCOPY SYSTEM

(71) Applicant: Carl Zeiss Meditec AG, Jena (DE)

(72) Inventors: Marco Wilzbach, Aalen (DE); Christoph Nieten, Jena (DE); Stefan Meinkuss, Aalen (DE)

(73) Assignee: Carl Zeiss Meditec AG, Jena (DE)

( * ) Notice: Subject to any disclaimer, the term of this patent is extended or adjusted under 35 U.S.C. 154(b) by 800 days.

(21) Appl. No.: 16/752,610

(22) Filed: Jan. 24, 2020

(65) Prior Publication Data

US 2020/0240918 A1 Jul. 30, 2020

(30) Foreign Application Priority Data

Jan. 24, 2019 (DE) .................... 10 2019 101 773.4

(51) Int. Cl.
*G01N 21/64* (2006.01)
*G02B 21/00* (2006.01)
*G02B 21/36* (2006.01)

(52) U.S. Cl.
CPC ..... *G01N 21/6458* (2013.01); *G02B 21/0076* (2013.01); *G02B 21/365* (2013.01)

(58) Field of Classification Search
CPC ............ G01N 21/6458; G02B 21/0076; G02B 21/365; G02B 21/082; G02B 21/16
(Continued)

(56) References Cited

U.S. PATENT DOCUMENTS 5,127,730 A * 7/1992 Brelje ................ G02B 21/0064
356/417
5,507,287 A 4/1996 Palcic et al.
(Continued)

FOREIGN PATENT DOCUMENTS

DE 69131176 T2 12/1999
DE 29824467 U1 5/2001
(Continued)

OTHER PUBLICATIONS

German Office Action, with translation thereof, for corresponding DE application No. 10 2019 101 773.4 dated Nov. 13, 2019.
(Continued)

*Primary Examiner* — Balram T Parbadia
*Assistant Examiner* — Rahman Abdur
(74) *Attorney, Agent, or Firm* — Ewers IP Law PLLC; Falk Ewers

(57) ABSTRACT

A microscopy system for simultaneously observing fluorescent and non-fluorescent regions of an object, and a method for operating the microscopy system are provided. The microscopy system includes a microscopy optical unit configured to image an object plane through an observation beam path onto an image plane, an observation filter arrangeable in the observation beam path, two light sources, one being provided for exciting a fluorescent dye in the object and another being provided for visualizing non-fluorescent regions of the object, and a controller to control the light sources individually. With a suitable configuration of the observation filter, all light sources can be operated with a minimum operating current, which ensures the stability of the light. The color rendering of the non-fluorescent regions can be set by the individual settability of the light sources which can be set such that fluorescent and non-fluorescent regions appear to be approximately equally bright.

43 Claims, 13 Drawing Sheets

(58) Field of Classification Search
USPC .......................................................... 359/385
See application file for complete search history.

(56) References Cited

U.S. PATENT DOCUMENTS

| | | | |
|---|---|---|---|
| 5,834,203 | A | 11/1998 | Katzir et al. |
| 6,042,785 | A | 3/2000 | Harju |
| 6,640,131 | B1 | 10/2003 | Trion et al. |
| 7,580,185 | B2 | 8/2009 | Haisch et al. |
| 8,730,601 | B2 | 5/2014 | Jess et al. |
| 2004/0109231 | A1 | 6/2004 | Haisch et al. |
| 2005/0270639 | A1 | 12/2005 | Miki |
| 2006/0198001 | A1 | 9/2006 | Spink |
| 2007/0203413 | A1 | 8/2007 | Frangioni |
| 2009/0266999 | A1 | 10/2009 | Krattiger |
| 2010/0044583 | A1 | 2/2010 | Steffen et al. |
| 2010/0110538 | A1 | 5/2010 | Steffen et al. |
| 2012/0057226 | A1 | 3/2012 | Kuster |
| 2012/0300294 | A1 | 11/2012 | Jess et al. |
| 2013/0307953 | A1* | 11/2013 | Hauger ................ A61B 5/0071 382/128 |
| 2016/0139391 | A1 | 5/2016 | Hauger et al. |
| 2016/0215330 | A1 | 7/2016 | Sonehara et al. |
| 2017/0235118 | A1 | 8/2017 | Kuster et al. |
| 2017/0237958 | A1 | 8/2017 | Themelis |
| 2018/0180477 | A1 | 6/2018 | Nieten et al. |
| 2019/0353596 | A1 | 11/2019 | Wilzbach et al. |

FOREIGN PATENT DOCUMENTS

| | | | | |
|---|---|---|---|---|
| DE | 10339784 | A1 | 3/2004 | |
| DE | 102006047911 | A1 | 4/2008 | |
| DE | 69738555 | T2 | 4/2009 | |
| DE | 102008018637 | A1 | 10/2009 | |
| DE | 102008034008 | A1 | 1/2010 | |
| DE | 102010033825 | A1 | 2/2012 | |
| DE | 102010044503 | A1 * | 3/2012 | ............ A61B 90/20 |
| DE | 102010044503 | A1 | 3/2012 | |
| DE | 102014016850 | A1 | 5/2016 | |
| DE | 112014003992 | T5 | 5/2016 | |
| DE | 102015011429 | A1 | 3/2017 | |
| DE | 102018114695 | B3 | 8/2019 | |
| EP | 930843 | B1 | 2/2004 | |
| EP | 1598688 | B1 | 6/2010 | |
| WO | 2005034747 | A1 | 4/2005 | |
| WO | 2007085496 | A1 | 8/2007 | |

OTHER PUBLICATIONS

Office Action dated Aug. 8, 2023, issued in Japanese counterpart application No. 2020-009782 and English-language translation thereof.

* cited by examiner

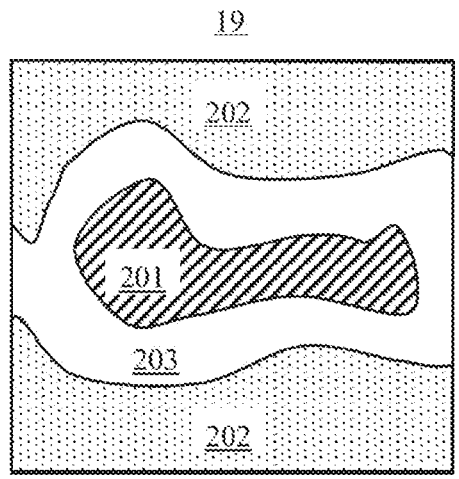
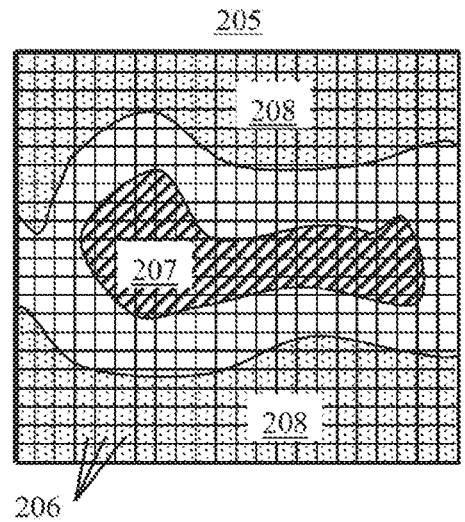
FIG. 20    FIG. 21
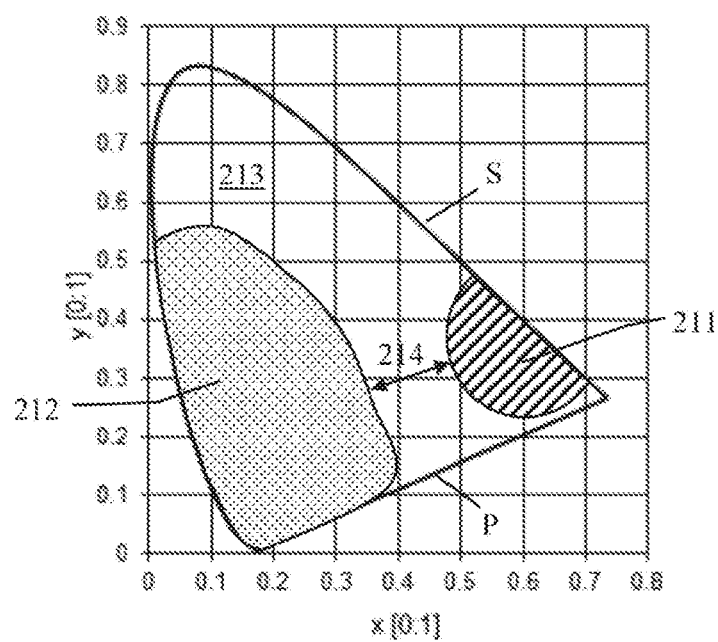
FIG. 22

MICROSCOPY SYSTEM AND METHOD FOR OPERATING A MICROSCOPY SYSTEM

CROSS REFERENCE TO RELATED APPLICATIONS

This application claims priority to German patent application DE 10 2019 101 773.4, filed Jan. 24, 2019, the entire content of which is incorporated herein by reference.

TECHNICAL FIELD

The present disclosure relates to a microscopy system and to a method for operating a microscopy system. In particular, the microscopy system and the method serve for simultaneously observing fluorescent and non-fluorescent regions of an object admixed with a fluorescent dye, for example protoporphyrin IX (PpIX) or fluorescein.

BACKGROUND

Microscopy systems for simultaneously or sequentially observing fluorescent and non-fluorescent regions of an object are used for example in the field of tumour surgery. A fluorescent dye is added to a tumorous tissue and binds to the tumorous tissue. However, the fluorescent dye does not bind to non-tumorous tissues. After the fluorescent dye has been excited, the tumorous tissue can be localized by recording an image of the tissue by fluorescent light and identifying the fluorescent regions therein.

In order that the tumorous tissue can be removed from the healthy tissue surrounding the tumorous tissue, the tumorous tissue has to be identified and localized relative to its surroundings. It is therefore necessary also to capture the surroundings, that is to say non-fluorescent regions of the object.

In order to achieve this, in conventional microscopy systems for simultaneously observing fluorescent and non-fluorescent regions of an object, use if made of a white light source having a spectrally approximately homogenous intensity in the visible wavelength range, for example a xenon lamp. The setting of the wavelength-dependent intensity of illumination light that is fed to the object is usually set by way of one or more illumination filters. The light emanating from the object and including both fluorescent light and light reflected at non-fluorescent regions is usually filtered by an observation filter and fed to an observer.

Since the ratio between the intensity of the fluorescent light and the intensity of the light used for exciting the fluorescent dye is very small, the fluorescent light and light reflected at non-fluorescent regions of the object are perceived as having greatly different brightnesses, which makes it more difficult to localize the fluorescent regions and thus the tumorous tissue. Moreover, the intensity of the fluorescent light that emanates from low grade tumors, in comparison with the intensity of the fluorescent light that emanates from high grade tumors, is smaller by a factor of up to 20, which additionally hampers the localization.

Moreover, the color rendering of non-fluorescent regions is often not true color, but rather characterized by a dominant color, with the result that the non-fluorescent region is presented to the surgeon in an unnatural color, which hampers the orientation in the non-fluorescent region. This rendering that is not true color is in part also caused by the fact that better profiles of the wavelength-dependent transmittances of the filters are technically not realizable, for example are not realizable as interference filters.

SUMMARY

It is an object of the present disclosure to provide a microscopy system, a method for operating a microscopy system, and a microscopy method which solves the problems mentioned above.

First Aspect

In accordance with a first aspect of the disclosure, a microscopy system for simultaneously observing fluorescent and non-fluorescent regions of an object includes a microscopy optical unit configured to image an object plane through an observation beam path onto an image plane, an observation filter arrangeable in the observation beam path, at least two (narrowband) light sources, and a controller configured to control one or a plurality of the at least two light sources individually, with the result that the ratio of the intensities of the light generated by the at least two light sources is variable.

An image detector can be arranged in the image plane of the microscopy optical unit in order thus to record an image of an object arranged in the object plane.

Of the at least two light sources, (at least) a first light source is configured to generate first light and to direct it onto the object region, wherein the first light is suitable for exciting a fluorescent dye present in the object. For this purpose, the first light includes light having wavelengths in the absorption range of the fluorescent dye. For PpIX, the first light can include wavelengths in the range of 380 nm to 420 nm.

Of the at least two light sources, (at least) a second light source is configured to generate second light and to direct it onto the object region, wherein the second light serves for visualizing non-fluorescent regions of the object. For this purpose, the second light includes light having wavelengths outside the absorption and emission ranges of the fluorescent dye.

One or a plurality of the light sources can be narrowband. Narrowband light sources generate light in accordance with a spectral intensity distribution, wherein the spectral intensity distribution has a maximum spectral emission intensity at a central wavelength and wherein the difference between an upper limiting wavelength, at which the spectral emission intensity is 1% of the maximum spectral emission intensity and which is larger than the central wavelength, and a lower limiting wavelength, at which the spectral emission intensity is 1% of the maximum spectral emission intensity and which is less than the central wavelength, is at most 150 nm, in particular at most 100 nm, more particularly at most 50 nm or at most 20 nm or at most 10 nm.

One or a plurality of the light sources can be controlled individually by the controller. That is to say that a light source can be controlled independently of the other light sources. The intensity of the light generated by the individually controllable light sources can thus be set individually. The ratio of the intensities of light generated by different light sources can thus be varied. By way of example, the controller is configured to vary the operating current and/or the operating voltage of the individually controllable light sources in order thereby to vary the intensity of the light generated by said light sources. The light sources are light emitting diodes, for example.

The (wavelength-dependent) transmittance of the observation filter is defined—as usual—as the ratio of the intensity of light of one wavelength that is transmitted by the observation filter to the intensity of light of the same wavelength that is directed onto the observation filter.

The transmittance of the observation filter is embodied such that it blocks (does not transmit) the light used for exciting the fluorescent dye, that it transmits to a predetermined degree the light used for visualizing non-fluorescent regions and that it transmits the fluorescent light in the best possible manner.

The following advantages are afforded by the individual settability of the light sources and thus of the spectral intensity components of the light directed onto the object and the suitable choice of the transmittance in the wavelength ranges used for visualizing non-fluorescent regions:

Firstly, the fluorescent regions and the non-fluorescent regions can be perceived as almost equally bright by virtue of the intensity of the light generated by the individual light sources being set accordingly. The first light source can be used to set the intensity of the fluorescent light emanating from the fluorescent regions (substantially independently of the second light source). The second light source can be used to set the intensity of the light reflected from the object at non-fluorescent regions (substantially independently of the first light source). The intensities of the light emanating from fluorescent and non-fluorescent regions can thus be coordinated with one another, with the result that both regions appear to be approximately equally bright.

Furthermore, all light sources can be operated in their emission-stable working ranges. The emission spectrum of light sources is generally not stable at very small operating currents and/or voltages. That is to say that the emission spectrum changes as the operating current changes. In order to avoid this, all light sources can be operated in their emission-stable working ranges, for example by all light sources being operated with at least 0.1% of their respective maximum power consumption. In order that the intensity of the light which is used for visualizing non-fluorescent regions and which is operated by a light source with at least 0.1% of its maximum power consumption is approximately equal to the intensity of the fluorescent light (i.e., fluorescent and non-fluorescent regions appear equally bright), the transmittance of the observation filter in the wavelength ranges used for visualizing non-fluorescent regions can be chosen to be correspondingly small. As a result, all light sources can be operated in their emission-stable working ranges.

Furthermore, an illumination filter is not required.

If at least two light sources and at least two separate passbands in the observation filter are used for visualizing non-fluorescent regions, a further advantage is afforded as a result: The color rendering of non-fluorescent regions can be set by the suitable choice of the intensities of the light generated by the light sources used for visualizing non-fluorescent regions and the transmittances of the passbands correspondingly provided for this purpose in the observation filter. In particular, the color rendering can be set to a true color rendering.

In the exemplary embodiments described below, the transmittance of the observation filter from $\lambda 1$ to $\lambda 2$ is less than W1, from $\lambda 3$ to $\lambda 4$ is larger than W2 and from $\lambda 5$ to $\lambda 6$ is larger than W3, wherein $\lambda 1$, $\lambda 2$, $\lambda 3$, $\lambda 4$, $\lambda 5$, and $\lambda 6$ are wavelengths for which 350 nm$<\lambda 1<\lambda 2 \leq \lambda 3<\lambda 4 \leq \lambda 5<\lambda 6<$750 nm holds true, and wherein W1, W2, and W3 are values for which 0$<$W1$<$W2$<$W3$<$1 holds true; and a first light source is configured to generate first light having wavelengths of between $\lambda 1$ and $\lambda 2$, and a second light source is configured to generate second light having wavelengths of between $\lambda 3$ and $\lambda 4$.

For the simultaneous observation of fluorescent and non-fluorescent regions of an object admixed with PpIX, the observation filter and the light sources can be configured as follows:

350 nm$<\lambda 1<$400 nm; and/or 410 nm$<\lambda 2<$440 nm; and/or 440 nm$<\lambda 3<$460 nm; and/or 480 nm$<\lambda 4<$620 nm; and/or 530 nm$<\lambda 5<$620 nm; and/or 650 nm$<\lambda 6<$750 nm; and/or
W1=0.1% or W1=0.01%; and/or
W2=1%; and/or
W3=90%.

First Exemplary Embodiment

For observing the non-fluorescent regions in the blue wavelength range, as is customary and desired in specific applications, the following settings furthermore hold true: 480 nm$<\lambda 4<$520 nm, and/or wherein the transmittance of the observation filter from $\lambda 3$ to $\lambda 4$ is larger than 10% and less than 60%, and/or wherein the transmittance of the observation filter from $\lambda 2+\Delta$ to $\lambda 3-\Delta$ and from $\lambda 4+\Delta$ to $\lambda 5-\Delta$ is less than 0.1 times W1, wherein 3 nm$\leq\Delta\leq$10 nm holds true, and/or wherein the intensity of the first light above $\lambda 3$ is at most 1% of its maximum spectral intensity, and/or wherein the intensity of the second light below $\lambda 2$ and above $\lambda 5$ is at most 1% of its maximum spectral intensity.

In order to be able to set the color rendering of the non-fluorescent regions, in particular to a true color rendering, the microscopy system further includes a third light source configured to generate third light having wavelengths of between $\lambda 7$ and $\lambda 8$ and to direct it onto the object plane, wherein $\lambda 7$, $\lambda 8$ are wavelengths and $\lambda 2<\lambda 7<\lambda 8<\lambda 5$ holds true. A description is given below of some configurations used to achieve a true color rendering of the non-fluorescent regions by suitable operation of the light sources.

Second Exemplary Embodiment

The transmittance of the observation filter from $\lambda 3$ to $\lambda 6$ is larger than W3. Typically, the intensity of the first light above $\lambda 3$ is at most 1% of its maximum spectral intensity. Typically, the intensity of the second light below $\lambda 2$ and above $\lambda 5$ is at most 1% of its maximum spectral intensity. Typically, the intensity of the third light below $\lambda 2$ and above $\lambda 5$ is at most 1% of its maximum spectral intensity.

Third Exemplary Embodiment

The transmittance of the observation filter from $\lambda 3$ to $\lambda 4$ is less than 5% and 600 nm$<\lambda 4<\lambda 5<$620 nm holds true. Typically, the intensity of the first light above $\lambda 3$ is at most 1% of its maximum spectral intensity. Typically, the intensity of the second light below $\lambda 2$ and above $\lambda 5$ is at most 1% of its maximum spectral intensity. Typically, the intensity of the third light below $\lambda 2$ and above $\lambda 5$ is at most 1% of its maximum spectral intensity.

Fourth Exemplary Embodiment

With further preference, the microscopy system according to the third exemplary embodiment further includes an illumination filter arrangeable between the light sources and the object plane, wherein the transmittance of the illumination filter from $\lambda 1$ to $\lambda 3'$ and from $\lambda 4'$ to $\lambda 4$ is larger than W3 and from $\lambda 3'+\Delta$ to $\lambda 4'-\Delta$ and from $\lambda 4+\Delta$ is less than W1, wherein 3 nm$\leq\Delta\leq$10 nm holds true, and wherein $\lambda 3'$ and $\lambda 4'$ are wavelengths and $\lambda 3<\lambda 3'<\lambda 4'<\lambda 4$ and 480 nm$<\lambda 3'<$520 nm and 520 nm<$\lambda 4'$<550 nm and $\lambda 4'-\lambda 3'$>20 nm hold true. Typically, the intensity of the first light above $\lambda 3$ is at most 1% of its maximum spectral intensity. Typically, the intensity of the second light below $\lambda 2$ and above $\lambda 4'$ is at most 1% of its maximum spectral intensity. Typically, the intensity of the third light between $\lambda 4'$ and $\lambda 4$ is significantly high and below $\lambda 3'$ and above $\lambda 5$ is at most 1% of its maximum spectral intensity.

Fifth Exemplary Embodiment

The transmittance of the observation filter from $\lambda 3$ to $\lambda 4$ is less than 5%; the transmittance of the observation filter from $\lambda 7$ to $\lambda 8$ is larger than W2 and less than 5%, and the transmittance of the observation filter from $\lambda 4+\Delta$ to $\lambda 7-\Delta$ is less than W1, wherein 3 nm<$\Delta$<10 nm holds true, wherein $\lambda 7$ and $\lambda 8$ are wavelengths and wherein $\lambda 4$<$\lambda 7$<$\lambda 8$<$\lambda 5$ and 480 nm<$\lambda 4$<520 nm and 520 nm<$\lambda 7$<550 nm and $\lambda 7$ $-\lambda 4$>20 nm and $\lambda 5$ $-\lambda 8$<30 nm hold true. Typically, the intensity of the first light above $\lambda 3$ is at most 1% of its maximum spectral intensity. Typically, the intensity of the second light below $\lambda 2$ and above $\lambda 7$ is at most 1% of its maximum spectral intensity. Typically, the intensity of the third light below $\lambda 4$ and above $\lambda 5$ is at most 1% of its maximum spectral intensity.

Sixth Exemplary embodiment

The transmittance of the observation filter from $\lambda 3$ to $\lambda 4$ is less than 5%, the transmittance of the observation filter from $\lambda 4+\Delta$ to $\lambda 5$ $-\Delta$ is less than W1, wherein 480 nm<$\lambda 4$<520 nm and 530 nm<$\lambda 5$<560 nm and $\lambda 5$ $-\lambda 4$>20 nm hold true. The microscopy system further includes an illumination filter arrangeable between the light sources and the object plane, wherein the transmittance of the illumination filter from $\lambda 1$ to $\lambda 4$ is larger than W3, wherein the transmittance of the illumination filter from $\lambda 4+\Delta$ to $\lambda 5'-\Delta$ is less than W1, wherein the transmittance of the illumination filter from $\lambda 5'$ to $\lambda 6'$ is larger than W2 and less than 5%, wherein the transmittance of the illumination filter from $\lambda 6'$ to $\lambda 6$ is less than W1, wherein 3 nm$\leq\Delta\leq$10 nm holds true, wherein $\lambda 5'$ and $\lambda 6'$ are wavelengths and $\lambda 4$<$\lambda 5'$<$\lambda 6'$<$\lambda 6$ holds true, and wherein 530 nm<$\lambda 5'$<570 nm and 600 nm<620 nm hold true. Typically, the intensity of the first light above $\lambda 3$ is at most 1% of its maximum spectral intensity. Typically, the intensity of the second light below $\lambda 2$ and above $\lambda 5$ is at most 1% of its maximum spectral intensity. Typically, the intensity of the third light below $\lambda 4$ and above $\lambda 5$ is at most 1% of its maximum spectral intensity.

For the simultaneous observation of fluorescent and non-fluorescent regions of an object admixed with PpIX, the light sources configured as follows are suitable, in particular, for the embodiments described above: The first light source can be a light emitting diode having a spectral emission maximum in the range of 400 nm to 420 nm and a full width at half maximum in the range of 10 nm to 20 nm. The second light source can be a light emitting diode having a spectral emission maximum in the range of 440 nm to 470 nm and a full width at half maximum in the range of 20 nm to 50 nm. The third light source can be a light emitting diode having a spectral emission maximum in the range of 500 nm to 560 nm and a full width at half maximum in the range of 40 nm to 110 nm.

Seventh Exemplary Embodiment

For the simultaneous observation of fluorescent and non-fluorescent regions of an object admixed with fluorescein, the microscopy system furthermore includes a third light source configured to generate third light having wavelengths of between $\lambda 5'$ and $\lambda 6'$ and to direct it onto the object plane, an illumination filter arrangeable between the light sources and the object plane, wherein the transmittance of the illumination filter from $\lambda 1$ to $\lambda 4$ is larger than W3, wherein the transmittance of the illumination filter from $\lambda 5'$ to $\lambda 6'$ is larger than W2 and less than 5%, wherein $\lambda 5'$, $\lambda 6'$ are wavelengths and $\lambda 5$<$\lambda 5'$<$\lambda 6'$ holds true, and wherein the transmittance of the observation filter from $\lambda 3$ to $\lambda 4$ is less than 5%.

Typically, the transmittance of the illumination filter from $\lambda 4+\Delta$ to $\lambda 5'-\Delta$ is less than W1, wherein 3 nm<$\Delta$<10 nm holds true. Typically, the transmittance of the illumination filter from $\lambda 6'$ to 750 nm is less than W1. Typically, the transmittance of the observation filter from $\lambda 4+\Delta$ to $\lambda 5-\Delta$ is less than W1, wherein 3 nm<$\Delta$<10 nm holds true.

The observation filter and the light sources can be configured as follows for the simultaneous observation of fluorescent and non-fluorescent regions of an object admixed with fluorescein:

350 nm<$\lambda 1$<460 nm; and/or 460 nm<$\lambda 2$<480 nm; and/or 470 nm<$\lambda 3$<490 nm; and/or 490 nm<$\lambda 4$<510 nm; and/or 520 nm<$\lambda 5$<550 nm; and/or 680 nm<$\lambda 6$<750 nm; and/or 620 nm<$\lambda 5'$<650 nm; and/or 680 nm<$\lambda 6'$<750 nm; and/or
W1=0.1% or W1=0.01%; and/or
W2=0.5%; and/or
W3=90%.

Typically, the intensity of the first light above $\lambda 5$ is at most 1% of its maximum spectral intensity. Typically, the intensity of the second light below $\lambda 3$ and above $\lambda 5'$ is at most 1% of its maximum spectral intensity. Typically, the intensity of the third light below $\lambda 4$ is at most 1% of its maximum spectral intensity.

For the simultaneous observation of fluorescent and non-fluorescent regions of an object admixed with fluorescein, the light sources configured as follows are suitable, in particular, for the exemplary embodiments described above: The first light source can be a light emitting diode having a spectral emission maximum in the range of 440 nm to 470 nm and a full width at half maximum in the range of 10 nm to 20 nm. The second light source can be a light emitting diode having a spectral emission maximum in the range of 500 nm to 560 nm and a full width at half maximum in the range of 40 nm to 110 nm. The third light source can be a light emitting diode having a spectral emission maximum in the range of 600 nm to 640 nm and a full width at half maximum in the range of 10 nm to 20 nm.

Typically, wavelength-dependent transmittances of the illumination filter and of the observation filter are coordinated with one another such that between 350 nm and 750 nm no wavelength exists at which both the absolute value of the wavelength-dependent gradient of the transmittance of the illumination filter and the absolute value of the wavelength-dependent gradient of the transmittance of the observation filter are larger than 2%/nm. This prevents a large change in the transmittance of the illumination filter and of the observation filter at a wavelength. Production dictated tolerances with regard to the transmittance of the illumination filter and of the observation filter therefore do not significantly affect the trueness of color and the brightness of different spectral ranges which are achieved with the illumination filters and observation filters.

Second Aspect

A second aspect of the present disclosure relates to a method for operating a microscopy system, in particular one of the microscopy systems described herein.

The method includes: generating illumination light and directing the generated illumination light onto an object; generating an observation beam path, which images the object into an image plane, wherein an observation filter is arranged in the observation beam path. The illumination light is generated such that $$|\vec{W}-\vec{f}| \leq 0.2 \qquad (1)$$

holds true, wherein $\vec{W}$ represents a color locus of a white point in the CIE standard chromaticity diagram of the CIE 1931 standard colorimetric system, and $\vec{f}$ represents a color locus having coordinates $x_f$ and $y_f$ in the CIE standard chromaticity diagram of the CIE 1931 standard colorimetric system.

The distance $|\cdot|$ between a color locus $\vec{A}$ having coordinates $x_A$ and $y_A$ in the CIE standard chromaticity diagram of the CIE 1931 standard colorimetric system and a color locus $\vec{B}$ having coordinates $x_B$ and $y_B$ and in the CIE standard chromaticity diagram of the CIE 1931 standard colorimetric system is defined as:

$$|\vec{A}-\vec{B}| = \left((x_A - x_B)^2 + (y_A - y_B)^2\right)^{1/2}$$

The coordinates $x_f$ and $y_f$ of the color locus $\vec{f}$ are defined by $$x_f = \frac{X}{X+Y+Z} \text{ and } y_f = \frac{Y}{X+Y+Z}, \qquad (2)$$

wherein X, Y and Z represent tristimulus values of the CIE 1931 standard colorimetric system which are defined by $$X = k \int I(\lambda) \cdot T(\lambda) \cdot \bar{x}(\lambda) \cdot d\lambda,$$

$$Y = k \int I(\lambda) \cdot T(\lambda) \cdot \bar{y}(\lambda) \cdot d\lambda, \text{ and}$$

$$Z = k \int I(\lambda) \cdot T(\lambda) \cdot \bar{z}(\lambda) \cdot d\lambda, \qquad (3)$$

wherein $I(\lambda)$ represents the intensity of the illumination light, $T(\lambda)$ represents the transmittance 41, 61, 81, 101, 121, 141, 161 of the observation filter 23, $\vec{x}(\lambda)$, $\vec{y}(\lambda)$, and $\vec{z}(\lambda)$ represent the spectral value functions of the TRG909926 CIE 1931 standard colorimetric system, and k is a constant.

The white point can be for example the white point D50 having the coordinates x=0.3457 and y=0.3585 in the CIE standard chromaticity diagram of the CIE 1931 standard colorimetric system. Alternatively, the white point can be for example the white point D65 having the coordinates x=0.3127 and y=0.329 in the CIE standard chromaticity diagram of the CIE 1931 standard colorimetric system. As a further alternative, the white point can correspond to a color valence whose color locus is at a distance of at most 0.2, in particular at most 0.1 or at most 0.05, from the color locus of the white point D50 in the CIE 1976 u'v' chromaticity diagram.

The distance $|\cdot|$ between a color locus $\vec{A}$ having coordinates $u'_A$ and $v'_A$ in the CIE 1976 u'v' chromaticity diagram and a color locus $\vec{B}$ having coordinates $u'_B$ and $v'_B$ in the CIE 1976 u'v' chromaticity diagram is defined as:

$$|\vec{A}-\vec{B}| = \left((u'_A - u'_B)^2 + (v'_A - v'_B)^2\right)^{1/2}$$

Typically, the illumination light is generated such that $|\vec{W}-\vec{f}| \leq 0.15$ or $|\vec{W}-\vec{f}| \leq 0.1$ holds true. The integrals over the wavelength $\lambda$ are integrated from 380 nm to 780 nm.

Equation 1 describes a condition for a maximum color valence distance in the CIE 1931 standard chromaticity diagram. In this case, $\vec{f}$ represents a color locus in the CIE standard chromativcity diagram of the CIE 1931 standard colorimetric system that is obtained if illumination light of the intensity $I(\lambda)$ impinges on a white object and the light emanating from the white object is filtered by an observation filter having the transmittance $T(\lambda)$. The required small distance from the white point in the CIE 1931 standard chromaticity diagram means that the white object can be observed as approximately white. When applied to general objects, this means that the object can be observed as approximately true color. This facilitates the orientation in the operating area for a surgeon.

The illumination light is generated for example by a plurality of light sources that generate light in different wavelength ranges. Generating the illumination light can include: setting, in particular varying, an energy fed to at least one of the plurality of light sources for generating the illumination light.

The method can be carried out by the microscopy systems described herein.

Third Aspect

A third aspect of the present disclosure relates to a microscopy method in which fluorescent regions and non-fluorescent regions can be perceived as approximately equally bright.

For this purpose, the microscopy method includes: generating illumination light and directing the generated illumination light onto an object, generating an observation beam path, which images the object into an image plane, wherein an observation filter is arranged in the observation beam path, wherein a first value, which represents a mean value of the transmittance of the observation filter over a first wavelength range, is less than a second value, which represents a mean value of the transmittance of the observation filter over a second wavelength range, wherein the second value is less than a third value, which represents a mean value of the transmittance of the observation filter over a third wavelength range, wherein a fourth value, which represents a mean value of the intensity of the illumination light over the first wavelength range is larger than a fifth value, which represents a mean value of the intensity of the illumination light over the second wavelength range, wherein the fifth value is larger than a sixth value, which represents a mean value of the intensity of the illumination light over the third wavelength range, wherein the first, second, and third wavelength ranges do not overlap one another and are in each case between 350 nm and 1000 nm.

The first wavelength range corresponds to that wavelength range in which a fluorescent dye present in the object has a significant absorption. In order to be able to excite the fluorescent dye efficiently, the illumination light in the first wavelength range has a high intensity characterized by the fourth value. In order that light in the first wavelength range that is reflected at the object does not swamp the fluorescent light generated substantially exclusively in the third wavelength range, the observation filter has in the first wavelength range a low transmittance characterized by the first value.

In order that the fluorescent light can be observed efficiently, the observation filter has in the third wavelength range a high transmittance characterized by the third value. In order that the fluorescent light is not swamped by illumination light in the third wavelength range that is reflected at the object, the illumination light in the third wavelength range has a low intensity characterized by the sixth value.

The second wavelength range serves for visualizing non-fluorescent regions of the object. For this purpose, the illumination light has a medium intensity in the second wavelength range, said intensity being characterized by the fifth value, and the observation filter has in the second wavelength range an average transmittance characterized by the second value.

The light in the first and second wavelength ranges that is transmitted by the observation filter brings about the visualization of non-fluorescent regions of the object and thus predominantly contributes to the brightness of the non-fluorescent regions in the image plane. The light in the third wavelength range that is transmitted by the observation filter brings about the visualization of fluorescent regions of the object and thus predominantly contributes to the brightness of the fluorescent regions in the image plane. The indicated relation of the first to sixth values with respect to one another has the effect that the non-fluorescent regions and the fluorescent regions of the object appear approximately equally bright. Moreover, they are coordinated with one another such that moreover an approximately true color observation of non-fluorescent regions is made possible.

The first wavelength range can contain wavelengths at which an absorption rate—normalized to their maximum value—of the fluorescent dye present in the object is at least 5%, in particular at least 10%, more particularly at least 50%. Accordingly, the first wavelength range contains those wavelengths at which the fluorescent dye can be excited efficiently.

The third wavelength range can contain wavelengths at which an emission rate—normalized to their maximum value—of the fluorescent dye present in the object is at least 5%, in particular at least 10%, more particularly at least 50%. Accordingly, the third wavelength range contains those wavelengths at which the fluorescent dye can be excited efficiently.

The second wavelength range can contain exclusively wavelengths at which an absorption rate—normalized to their maximum value—of the fluorescent dye present in the object is at most 20%, in particular at most 10%, more particularly at most 5%, and at which an emission rate—normalized to their maximum value—of the fluorescent dye present in the object is at most 20%, in particular at most 10%, more particularly at most 5%. Accordingly, the second wavelength range contains substantially only those wavelengths which lie outside the wavelength ranges in which the fluorescent dye can be excited efficiently and generates fluorescent light.

With the use of the fluorescent dye protoporphyrin IX, the first wavelength range typically includes the wavelength 405 nm and/or wavelengths of 390 nm to 420 nm, the second wavelength range typically includes wavelengths of 450 nm to 600 nm and the third wavelength range typically includes wavelengths of 620 nm to 720 nm.

With the use of the fluorescent dye fluorescein, the first wavelength range typically includes wavelengths of 480 nm to 500 nm, the second wavelength range typically includes wavelengths of 620 nm to 750 nm and the third wavelength range typically includes wavelengths of 550 nm to 600 nm.

Typically, a ratio of the first value to the second value is at most 1/100, in particular at most 1/1000. Typically, a ratio of the second value to the third value is at most 0.9, in particular at most 0.8, more particularly at most 0.5. Typically, a ratio of the fourth value to the fifth value is at least 2, in particular at least 5. Typically, a ratio of the fourth value to the sixth value is at least 1000, in particular at least 10000. Both an approximately equal brightness and an approximately true color rendering are achieved as a result.

The illumination light can be generated using a plurality of (narrowband) light sources, for example using the light sources described with regard to other aspects. At least one of the light sources generates light having wavelengths in the first wavelength range; at least one of the light sources generates light having wavelengths in the second wavelength range. At least one of the light sources can be individually controllable in order thereby to be able to vary the ratio between the intensity of the light having wavelengths in the first wavelength range and the intensity of the light having wavelengths in the second wavelength range.

Typically, the light sources generate substantially no light having wavelengths in the third wavelength range. This prevents the light generated by the light sources from corrupting the fluorescent light in the third wavelength range.

An alternative microscopy method includes generating illumination light and directing the generated illumination light onto an object, generating an observation beam path, which images the object into an image plane, wherein the illumination light is generated such that a ratio of a first characteristic value to a second characteristic value has a value in the range of 20/1 to 1/20, wherein the first characteristic value is a value of a characteristic variable for the intensity of light of the observation beam path at first locations in the image plane, at which first locations color valences of the light of the observation beam path lie within a first color valence range of a color space, wherein the second characteristic value is a value of the characteristic variable for the intensity of the light of the observation beam path at second locations in the image plane, at which second locations color valences of the light of the observation beam path lie within a second color valence range of the color space.

Typically, the illumination light is generated such that the ratio of the first characteristic value to the second characteristic value has a value in the range of 10/1 to 1/10 or 5/1 to 1/5 or 3/1 to 1/3.

A projected image of the object is generated in the image plane through the observation beam path. If a fluorescent dye present in the object is excited by the illumination light, the projected image generally includes fluorescent regions (first locations) and non-fluorescent regions (second locations). Strongly fluorescent regions (first locations) have in the projected image the color valences typical of the fluorescent dye, which lie within the first color valence range. Weakly fluorescent and non-fluorescent regions (second locations) have in the projected image other color valences, which lie within the second color valence range. Accordingly, the first and second color valence ranges are non-overlapping ranges of the same color space.

Fluorescent regions of the object (first locations) can be distinguished from non-fluorescent regions (second locations) in the image plane on the basis of the color valences typical of the fluorescent dye. In order that both fluorescent and non-fluorescent regions can be distinguished by an observer or a controller, it is advantageous if the fluorescent and the non-fluorescent regions appear approximately equally bright, that is to say have an intensity of approximately equal magnitude or a luminous flux of approximately equal magnitude in the image plane. Luminous flux denotes that proportion of a radiation power which is visible to the human eye, weighted with the luminous efficiency curve of the human eye.

This is achieved in the microscopy method by virtue of the illumination light being generated such that the ratio of the first characteristic value to the second characteristic value has a value in the range of 20/1 to 1/20. The first characteristic value represents for example the mean value of the intensity of the light in the observation beam path in the image plane at the first locations, that is to say those locations in the image plane at which the light in the observation beam path has the color valences typical of the fluorescent dye. In this example, the second characteristic value represents the mean value of the intensity of the light in the observation beam path in the image plane at the second locations, that is to say those locations in the image plane at which the light in the observation beam path does not have the color valences typical of the fluorescent dye.

The first characteristic value and the second characteristic value respectively represent a value of a characteristic variable of the same type. By way of example, if the first characteristic value represents a maximum value, then the second characteristic value likewise represents a maximum value. Alternatively, if the first characteristic value represents a mean value, for example, then the second characteristic value likewise represents a mean value.

The first characteristic value can represent a maximum value or a mean value of the intensity (or of the luminous flux) of the light of the observation beam path at the first locations. The second characteristic value can represent a maximum value or a mean value of the intensity (or of the luminous flux) of the light of the observation beam path at the second locations.

The microscopy method can furthermore include determining the first locations in the image plane, at which first locations the color valences of the light of the observation beam path lie within the first color valence range of the color space, determining the second locations in the image plane, at which second locations the color valences of the light of the observation beam path lie within the second color valence range of the color space, wherein the illumination light is generated depending on the intensity of the light of the observation beam path at the first locations determined and depending on the intensity of the light of the observation beam path at the second locations determined. As a result, the first and second locations in the image plane are identified and the illumination light is generated depending on the intensity at these locations.

The microscopy method can further include determining the intensity of the light in the observation beam path at the first and second locations for determining the luminous flux of the light in the observation beam path at the first and second locations. By way of example, an image detector is arranged in the image plane, and is configured to record a color image of the projected image, based on which firstly the first and second locations can be identified and secondly the intensity of the light in the observation beam path at the first and second locations can be determined.

The microscopy method can furthermore include recording an image of the object in the image plane, wherein the image includes a plurality of image points, comparing color valences at the image points of the image with the first color valence range and/or with the second color valence range, determining first image points from the plurality of image points based on a result of the comparison, wherein the first image points correspond to the first locations in the image plane and wherein color valences at the first image points lie within the first color valence range of the color space, and determining second image points from the plurality of image points on the basis of a result of the comparison, wherein the second image points correspond to the second locations in the image plane and wherein color valences at the second image points lie within the second color valence range of the color space.

The microscopy method can further includes determining the first characteristic value on the basis of the determined intensity of the light of the observation beam path at the first locations determined, and determining the second characteristic value on the basis of the determined intensity of the light of the observation beam path at the second locations determined, wherein the illumination light is generated depending on the first characteristic value determined and depending on the second characteristic value determined. Accordingly, the first and second characteristic values are determined, for example calculated, specifically based on the determined or measured intensity values at the first and second locations that were identified previously on the basis of a recorded image and on the basis of their color valences, in particular by comparison with the first and second color valence ranges. The first and second characteristic values thus obtained are then used for generating the illumination light.

The illumination light is generated for example by a plurality of light sources which generate light in different wavelength ranges. Generating the illumination light can include setting, in particular varying, an energy fed to at least one of the plurality of light sources for generating the illumination light, depending on the first and second characteristic values.

In particular, provision can be made for the illumination light to be generated independently of the intensity of light of the observation beam path at third locations in the image plane, wherein color valences of the light of the observation beam path at the third locations lie outside the first and second color valence ranges. That is to say that exclusively the intensity of the light in the observation beam path at the first and second locations is used for generating the illumination light. The intensity of the light in the observation beam path at other locations in the image plane is not used for generating the illumination light.

The first color valence range and the second color valence range can be chosen such that a smallest color difference between the first color valence range and the second color valence range in the CIE 1976 u'v' chromaticity diagram is at least 0.01, in particular at least 0.1. Furthermore, the first color valence range can be chosen such that it is limited to color valences which have a color difference of at most 0.1, in particular at most 0.03 or at most 0.01, with respect to reference color valences in the CIE 1976 u'v' chromaticity diagram, wherein the reference color valences correspond to light in a reference wavelength range containing exclusively wavelengths at which an emission rate—normalized to their maximum value—of a fluorescent dye present in the object is at least 5%, in particular at least 10%, more particularly at least 50%. The reference color valence is for example a color valence which corresponds to the emission spectrum of a fluorescent dye in the object. Accordingly, only such color valences which are separated from said reference color valence by not more than the maximum difference indicated belong to the first color valence range.

If the fluorescent dye is PpIX, it is typical for the first color valence range to include a color valence which corresponds to light having a wavelength of 635 nm. Furthermore, it is typical for the first color valence range to be limited to color valences which have a color difference of at most 0.1, in particular at most 0.03 or at most 0.01 with respect to a reference color valence corresponding to light having a wavelength of 635 nm in the CIE 1976 u'v' chromaticity diagram.

If the fluorescent dye is fluorescein, it is typical for the first color valence range to comprise a color valence which corresponds to light having a wavelength of 530 nm. Furthermore, it is typical for the first color valence range to be limited to color valences which have a color difference of at most 0.1, in particular at most 0.03 or at most 0.01 with respect to a reference color valence corresponding to light having a wavelength of 530 nm in the CIE 1976 u'v' chromaticity diagram.

Features of the first, second, and third aspects can be combined with one another.

The observation filters and illumination filters described herein can be embodied for example as interference filters. Interference filters include a plurality of layers of materials having different optical properties, for example different refractive indices. Each layer can have a different thickness. The number of layers can be between a few and several hundred, depending on the requirements made of the filter. The transmittances described herein can be realized by the specific choice of the thickness and the optical property of each layer.

Aids for determining the thicknesses and optical properties of the layers of a filter depending on a predefined wavelength-dependent transmittance are known. Such layer sequences can be designed using simulation programs that use as input data the optical properties (refractive index and absorption depending on the wavelength, dispersion) of the materials to be used and also the desired transmission and/or reflection spectrum. The simulation program outputs the simulated transmission and/or reflection spectrum and also the layer sequence and/or the thickness of the layers and the optical properties and/or materials used. The calculation can be carried out in an iteration method. In this way, even filters with complicated requirements, e.g. multiband filters, can be designed and produced.

BRIEF DESCRIPTION OF THE DRAWINGS

The disclosure will now be described with reference to the drawings wherein:

FIG. 20 shows a schematic illustration of a projected image of an object in an image plane;

FIG. 21 shows a schematic illustration of an image of the projected image shown in FIG. 20, which image includes a plurality of image points;

FIG. 22 shows a CIE 1931 standard chromaticity diagram for elucidating color valence ranges.

DESCRIPTION OF EXEMPLARY EMBODIMENTS

Figure 1:
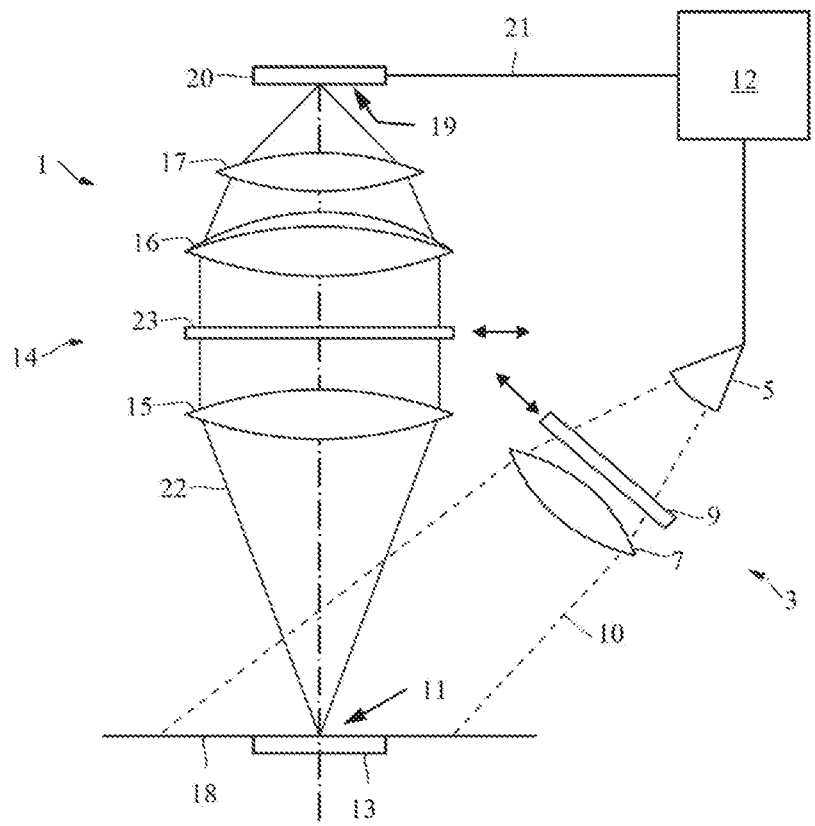
FIG. 1 shows a microscopy system according to an exemplary embodiment of the disclosure.

FIG. 1 shows one exemplary microscopy system 1 for simultaneously observing fluorescent and non-fluorescent regions of an object.

The microscopy system 1 includes an illumination device 3. The illumination device 3 comprises a plurality of light sources 5, an illumination optical unit 7 and an illumination filter 9, which can optionally be arranged in an observation beam path 10 formed by the illumination optical unit 7. This is illustrated by a double headed arrow in FIG. 1. By the plurality of light sources 5 and the illumination filter 9, the illumination device 3 can generate various illumination light spectra and direct them onto an object region 11.

The microscopy system 1 includes a controller 12 configured to control the plurality of light sources 5 individually, i.e., independently of one another. By way of example, the light sources are two or more light emitting diodes. Each of the light emitting diodes can be controlled individually by the controller 12. By way of example, the controller 12 controls the operating current and/or the operating voltage fed and/or respectively applied to a light emitting diode in order to generate light. The intensity of the light generated by the light sources 5 can be set individually as a result.

By the observation beam path 10, the illumination device 3 directs illumination light onto the object region 11, in which an object 13 can be arranged, which can be admixed with a fluorescent dye. The fluorescent dye fed to the object 13 accumulates greatly in some regions of the object 13 (fluorescent regions). These regions contain tumor cells, for example, to which the fluorescent dye binds. The fluorescent dye does not accumulate or accumulates only slightly in other regions of the object 13 (non-fluorescent regions). These regions contain no tumor cells, for example.

The microscopy system 1 further includes a microscopy optical unit 14, which in the present example includes an objective 15 and further lenses 16 and 17. The microscopy optical unit 14 is configured to image the object region 11, in particular an object plane 18, onto an image plane 19. In the present example, a detection area of a light detector 20 of the microscopy system 1 is arranged in the image plane 19. The light detector 20 can be an image sensor for example. The light detector 20 outputs a signal representing the intensity of the light impinging on the detection area of the light detector 20. The light detector 20 is connected to the controller 12 and the controller 12 receives from the light detector 20 the signal 21 output by the latter. The controller can process and display the image generated by the light detector 20. Instead of or in addition to the light detector 20, an eyepiece can be provided, which, in conjunction with the microscopy optical unit 14, is suitable for imaging the object plane 18 onto the retina of an eye.

An observation filter 23 can be arranged in the observation beam path 22 provided by the microscopy optical unit 14, said observation beam path imaging the object plane 18 onto the image plane 19. Furthermore, an actuator (not shown) can be provided, which can introduce the observation filter 23 into the observation beam path 22 and can withdraw the observation filter 23 from the observation beam path 22. This is illustrated by a double headed arrow in FIG. 1.

Depending on the configuration of the plurality of light sources 5, of the illumination filter 9 and of the observation filter 23, fluorescent and non-fluorescent regions of the object 13 can be observed simultaneously. Various exemplary embodiments for the fluorescent dyes protoporphyrin IX (PpIX) and fluorescein are described below.

Figure 2:
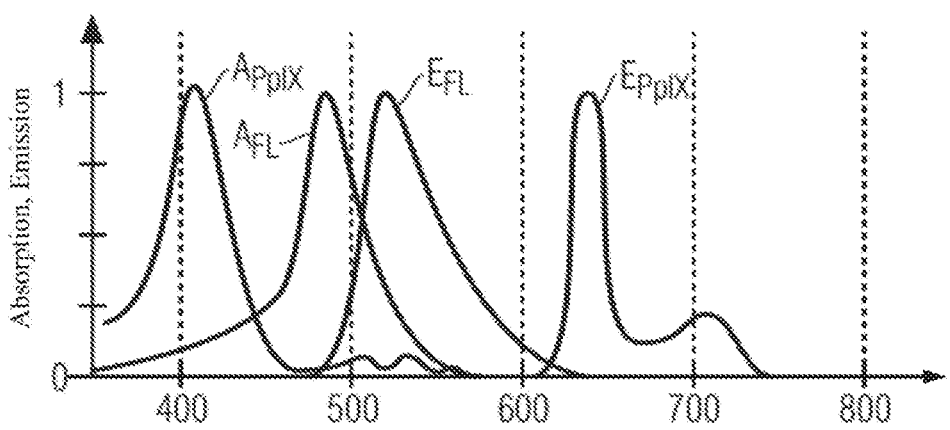
FIG. 2 shows absorption and emission spectra of PpIX and fluorescein.

FIG. 2 shows the wavelength-dependent absorption spectrum of PpIX as graph A,PpIX, the wavelength-dependent emission spectrum of PpIX as graph EPpIX, the wavelength-dependent absorption spectrum of fluorescein as graph AFL and the wavelength-dependent emission spectrum of fluorescein as graph EFL.

The fluorescent dye PpIX has an absorption spectrum PpIX which between 350 nm and 430 nm has a normalized absorption intensity of more than 0.2. The normalized absorption intensity is normalized to the maximum absorption intensity, i.e., the normalized absorption spectrum only has values of between 0 and 1. The fluorescent dye PpIX can therefore be excited efficiently in the range of 350 nm to 430 nm. The fluorescent dye PpIX has the maximum of the absorption at approximately 405 nm. The fluorescent dye PpIX emits fluorescent light in a spectral range from approximately 600 nm to 750 nm, with a main maximum of the emission intensity lying at 635 nm and a secondary maximum lying at approximately 705 nm.

The fluorescent dye fluorescein has a normalized absorption intensity of more than 0.2 between approximately 450 nm and 530 nm. Therefore, the fluorescent dye fluorescein can be excited well in this range. The absorption spectrum of fluorescein has a maximum at approximately 495 nm. The fluorescent dye fluorescein emits emission light in the range from approximately 490 nm to 650 nm. The maximum of the emission spectrum lies at approximately 520 nm.

Example with Respect to the First Embodiment

Figure 3:
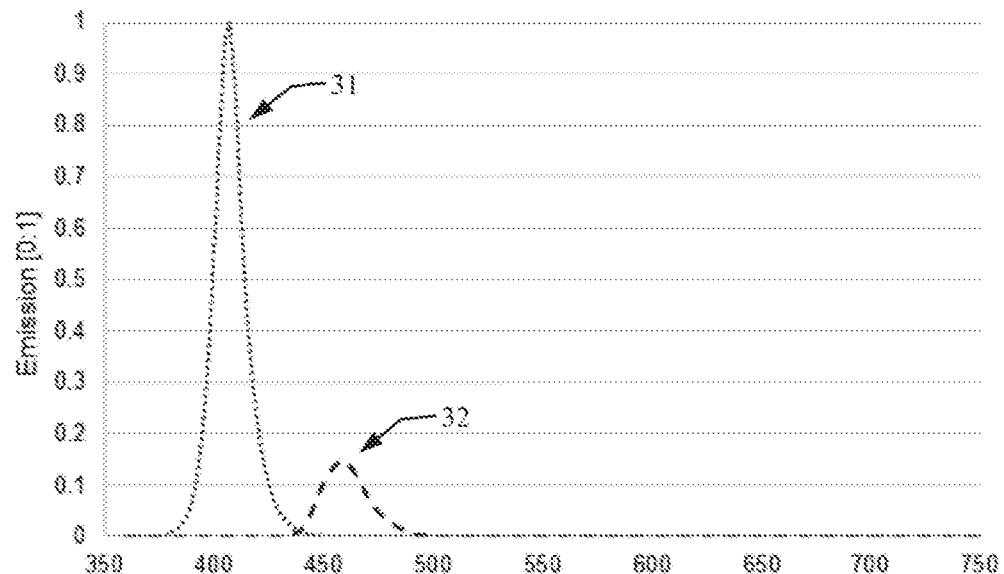
FIG. 3 shows illumination light spectra of two light sources according to a first exemplary embodiment.

FIG. 3 shows illumination light spectra (spectral intensity distributions) 31 and 32 of a first and a second light source in accordance with the first exemplary embodiment. The first light source serves substantially exclusively for exciting the fluorescent dye PpIX, i.e., for visualizing fluorescent regions of the object. The second light source serves substantially exclusively for visualizing non-fluorescent regions of the object.

The first light source generates an illumination light spectrum 31 having a spectral emission maximum in the range of 400 nm to 410 nm and a full width at half maximum in the range of 10 nm to 20 nm. Below approximately 370 nm and above approximately 450 nm, the intensity of the first light generated by the first light source is at most 1% of its maximum spectral intensity. The first light source is a light-emitting diode, for example.

The second light source generates an illumination light spectrum 32 having a spectral emission maximum in the range of 440 nm to 470 nm and a full width at half maximum in the range of 20 nm to 50 nm. Below approximately 440 nm and above approximately 500 nm, the intensity of the second light generated by the second light source is at most 1% of its maximum spectral intensity. The second light source is a light-emitting diode, for example.

The first and second light sources are operated such that the maximum spectral intensity of the first light source is at most 20 times and at least 3 times the magnitude of the maximum spectral intensity of the second light source.

Figure 4:
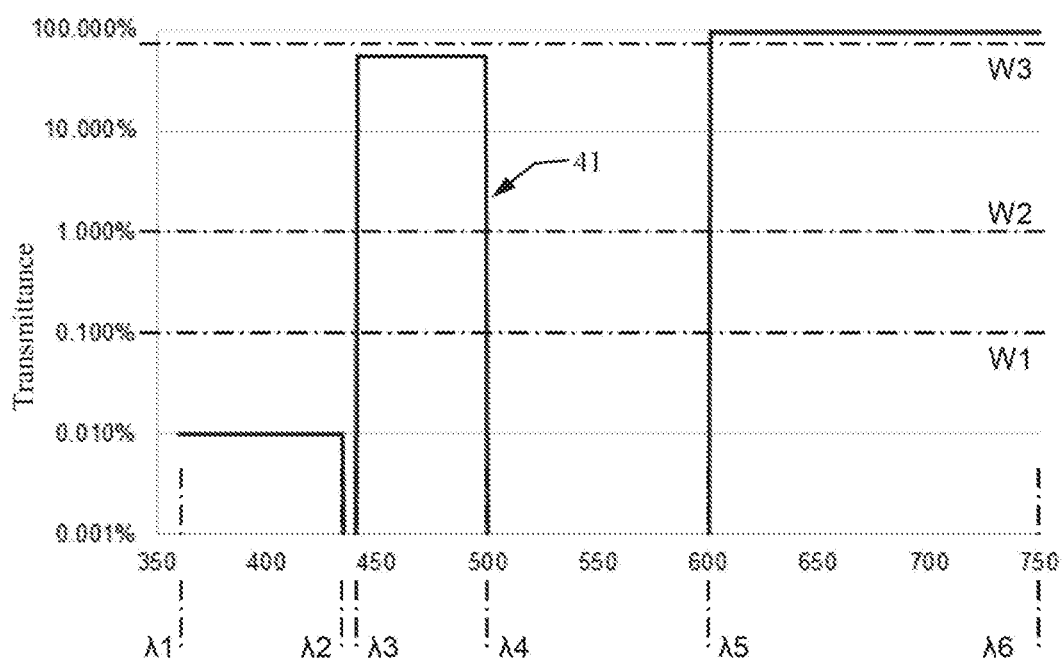
FIG. 4 shows the wavelength-dependent transmittance of an observation filter according to the first exemplary embodiment.

FIG. 4 shows the wavelength-dependent transmittance 41 of an observation filter 23 in accordance with the first embodiment. From $\lambda 1=360$ nm to $\lambda 2=430$ nm the transmittance 41 is approximately 0.01%. From $\lambda 3=435$ nm to $\lambda 4=500$ nm the transmittance 41 is approximately 55%. From $\lambda 5=600$ nm to $\lambda 6=750$ nm the transmittance 41 is approximately 95%. In the remaining wavelength ranges between $\lambda 1$ and $\lambda 6$ the transmittance 41 is at most 0.001%. Furthermore, it holds true that: W1=0.1%; W2=1%; and W3=80%.

Accordingly, the observation filter 23 suppresses the first light reflected at the object 13, said first light having a high intensity substantially only between $\lambda 1$ and $\lambda 2$. Furthermore, the second light reflected at the object 13, said second light having a high intensity substantially only between $\lambda 3$ and $\lambda 4$, is transmitted by the observation filter 23, with the result that non-fluorescent regions of the object 13 can be observed as bluish. Furthermore, the fluorescent light emanating from the object 13, said fluorescent light having a high intensity substantially only between $\lambda 5$ and $\lambda 6$ is transmitted by the observation filter 23, with the result that fluorescent regions of the object 13 can be observed as reddish color valences.

Two major advantages are afforded by the individual settability of the intensities of the first and second light (cf. FIG. 3) and the concrete choice of the transmittance 41 of the observation filter 23. Firstly, the fluorescent regions and the non-fluorescent regions can be perceived as almost equally bright by virtue of the intensity of the light sources being set accordingly. Secondly, on account of the concrete choice of the transmittance 41 between $\lambda 3$ and $\lambda 4$ and also between $\lambda 5$ and $\lambda 6$, the light sources can be operated here in their stable emission range. Moreover, an illumination filter is not required.

Examples with Respect to the Second to Sixth Exemplary Embodiments

Figure 5:
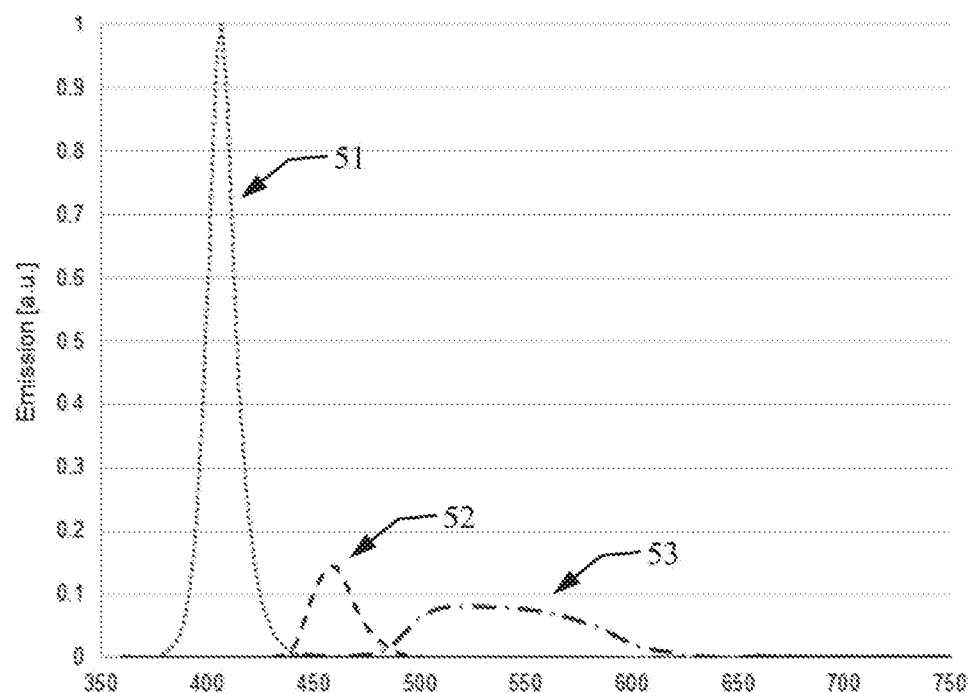
FIG. 5 shows illumination light spectra of three light sources according to a second to a sixth embodiment.

FIG. 5 shows illumination light spectra (spectral intensity distributions) 51, 52, and 53 of a first, a second, and a third light source in accordance with a second to sixth exemplary embodiment. The first light source serves substantially exclusively for exciting the fluorescent dye PpIX, i.e., for visualizing fluorescent regions of the object. The second and third light sources serve substantially exclusively for visualizing non-fluorescent regions of the object.

The first and second light sources correspond to those of the example with respect to the first exemplary embodiment. That is to say that the illumination light spectrum 31 of the first light source of the first exemplary embodiment as illustrated in FIG. 3 and the illumination light spectrum 51 of the first light source of the second to sixth exemplary embodiments as illustrated in FIG. 5 are identical, and that the illumination light spectrum 32 of the second light source of the first embodiment as illustrated in FIG. 3 and the illumination light spectrum 52 of the second light source of the second to sixth embodiments as illustrated in FIG. 5 are identical.

The third light source generates an illumination light spectrum 53 having a spectral emission maximum in the range of 500 nm to 560 nm and a fullwidth at half maximum in the range of 40 nm to 110 nm. Below approximately 470 nm and above approximately 630 nm, the intensity of the third light generated by the third light source is at most 1% of its maximum spectral intensity. The third light source is a light-emitting diode, for example.

The first and third light sources are operated such that the maximum spectral intensity of the first light source is at most 20 times and at least 3 times the magnitude of the maximum spectral intensity of the third light source.

Example with Respect to the Second Exemplary Embodiment

Figure 6:
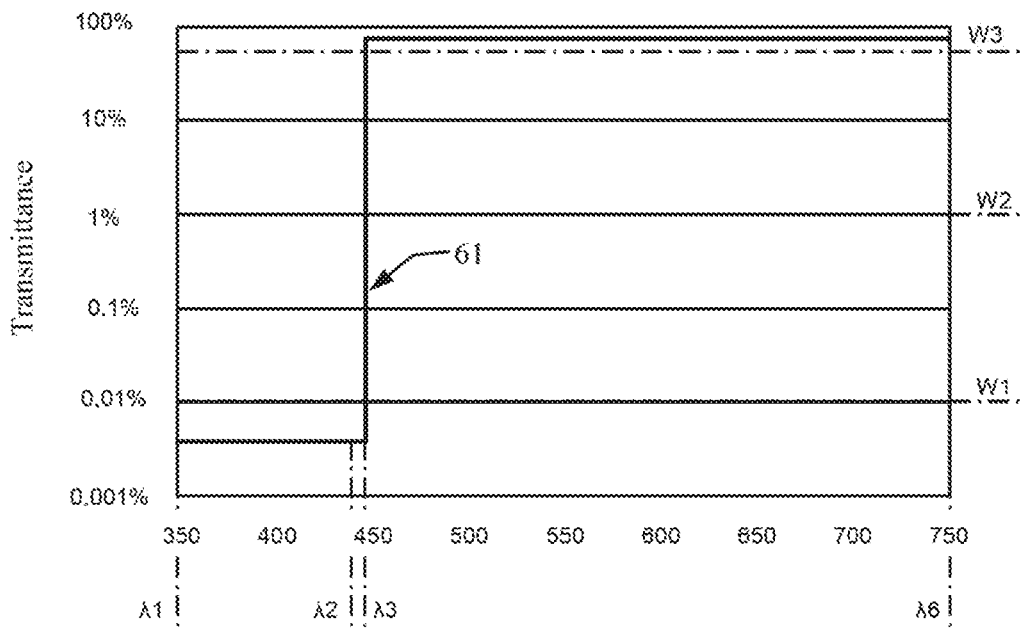
FIG. 6 shows the wavelength-dependent transmittance of an observation filter according to the second exemplary embodiment.

FIG. 6 shows the wavelength-dependent transmittance 61 of an observation filter 23 in accordance with the second exemplary embodiment. From $\lambda 1=350$ nm to $\lambda 2=435$ nm the transmittance 61 is approximately 0.005%. From $\lambda 3=440$ nm to $\lambda 4=\lambda 5=600$ nm and from $\lambda 5$ to $\lambda 6=750$ nm the transmittance 61 is approximately 95%. Furthermore, it holds true that: W1=0.01%, W2=1%, and W3=80%.

Accordingly, the observation filter 23 suppresses the first light reflected at the object 13, said first light having a high intensity substantially only between $\lambda 1$ and $\lambda 2$. Furthermore, the second and third light reflected at the object 13, said second and third light having a high intensity substantially only between $\lambda 3$ and $\lambda 4$ is transmitted by the observation filter 23, with the result that non-fluorescent regions of the object 13 can be observed as approximately true color. Furthermore, the fluorescent light emanating from the object 13, said fluorescent light having a high intensity substantially only between $\lambda 5$ and $\lambda 6$ is transmitted by the observation filter 23, with the result that fluorescent regions of the object 13 can be observed as reddish color valences.

Three major advantages are afforded by the individual settability of the intensities of the first, second and third light (cf. FIG. 5) and the concrete choice of the transmittance 61 of the observation filter 23. Firstly, the fluorescent regions and the non-fluorescent regions can be perceived as almost equally bright by virtue of the intensity of the light sources being set accordingly. Furthermore, on account of the concrete choice of the transmittance 61 between $\lambda 3$ and $\lambda 4$ and also between $\lambda 5$ and $\lambda 6$, the light sources can be operated here in their stable emission range. Finally, as a result of the individual settability of the intensities of the second and third light, the color rendering of the non-fluorescent regions can be set such that the non-fluorescent regions can be observed as approximately true color. Moreover, an illumination filter is not required.

Figure 7:
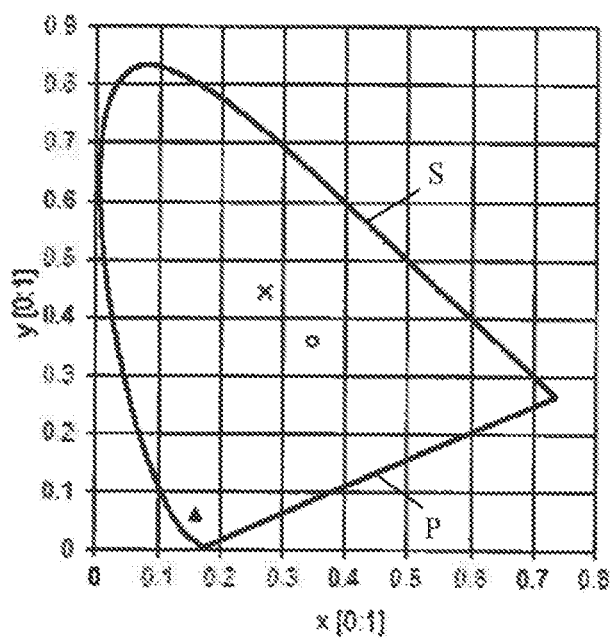
FIG. 7 shows a CIE 1931 standard chromaticity diagram for elucidating the color valence which can be achieved for a white object by the second embodiment.

FIG. 7 shows the CIE 1931 xy standard chromaticity diagram including the spectrum locus S and the purple boundary P. A hollow circle represents the D50 white point at x=0.3457, y=0.3585. A cross at approximately x=0.26, y=0.45 represents a color valence with which a white object is perceived by the normal observer using the microscopy system in accordance with the second exemplary embodiment if the observation filter is configured as shown in FIG. 6, the maximum spectral intensity of the light generated by the first light source is in each case approximately 20 times the magnitude of the maximum spectral intensity of the light generated by the second and third light source, respectively. Non-fluorescent regions of the object can therefore be perceived as approximately true color. In addition, this configuration results in an approximately equal brightness of fluorescent and non-fluorescent regions of the object.

Example with Respect to the Third Exemplary Embodiment

Figure 8:
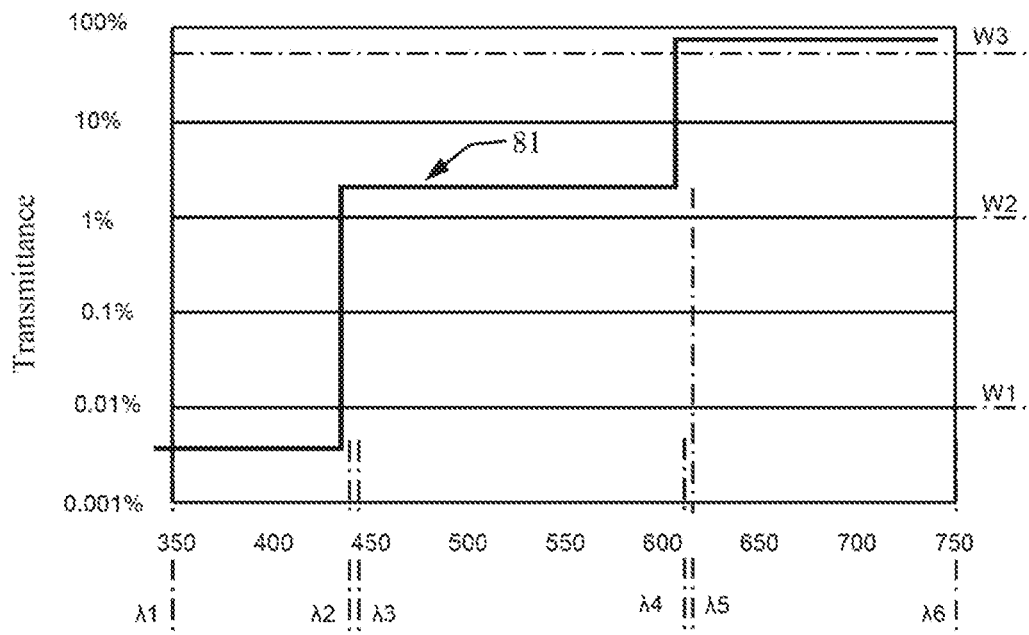
FIG. 8 shows the wavelength-dependent transmittance of an observation filter of the third embodiment.

FIG. 8 shows the wavelength-dependent transmittance 81 of an observation filter 23 in accordance with the third exemplary embodiment. From $\lambda 1=350$ nm to $\lambda 2=435$ nm the transmittance 81 is approximately 0.005%. From $\lambda 3=440$ nm to $\lambda 4=610$ nm the transmittance 81 is approximately 2%. From $\lambda 5=620$ nm to $\lambda 6=750$ nm the transmittance 81 is approximately 95%. Furthermore, it holds true that W1=0.01%, W2=1%, and W3=80%.

Accordingly, the observation filter 23 suppresses the first light reflected at the object 13, said first light having a high intensity substantially only between $\lambda 1$ and $\lambda 2$. Furthermore, the second and third light reflected at the object 13, said second and third light having a high intensity substantially only between $\lambda 3$ and $\lambda 4$ is transmitted by the observation filter 23, with the result that non-fluorescent regions of the object 13 can be observed as approximately true color. Furthermore, the fluorescent light emanating from the object 13, said fluorescent light having a high intensity substantially only between $\lambda 5$ and $\lambda 6$ is transmitted by the observation filter 23, with the result that fluorescent regions of the object 13 can be observed as reddish color valences.

The advantages of the example of the second exemplary embodiment can be afforded by the individual settability of the intensities of the first, second and third light (cf. FIG. 5), wherein a better, trueness of the observation of the non-fluorescent regions is achieved on account of the lower transmittance 81 between $\lambda 3$ and $\lambda 4$ in comparison with the second exemplary embodiment. In addition, the second and third light sources can be operated with a higher power in comparison with the second exemplary embodiment, which in turn improves the stability of the illumination light spectra 52, 53 generated. Moreover, an illumination filter is not required.

Figure 9:
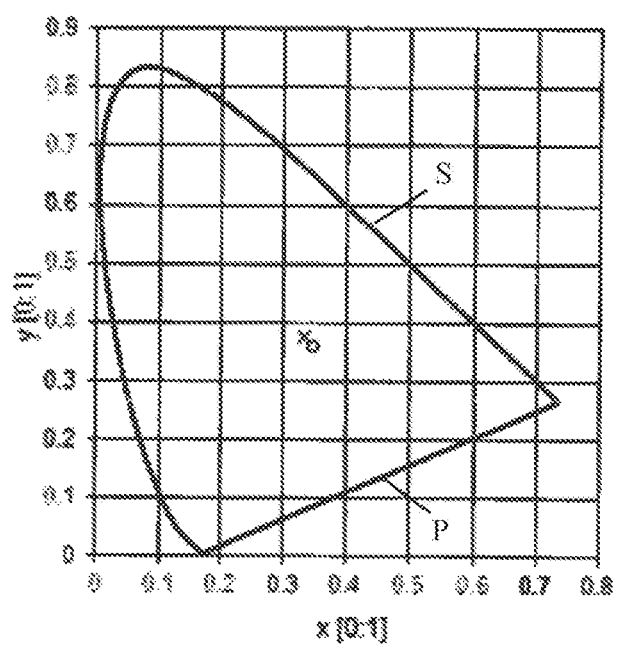
FIG. 9 shows a CIE 1931 standard chromaticity diagram for elucidating the color valence which can be achieved for a white object by the third exemplary embodiment.

FIG. 9 shows the CIE 1931 xy standard chromaticity diagram including the spectrum locus S and the purple boundary P. A hollow circle represents the D50 white point at x=0.3457, y=0.3585. A cross at approximately x=0.33, y=0.38 represents a color valence with which a white object is perceived by the normal observer using the microscopy system in accordance with the third embodiment if the observation filter is configured as shown in FIG. 8, the maximum spectral intensity of the light generated by the first light source is in each case approximately 7 times the magnitude of the maximum spectral intensity of the light generated by the second light source and the maximum spectral intensity of the light generated by the first light source is approximately 5 times the magnitude of the maximum spectral intensity of the light generated by the third light source. Non-fluorescent regions of the object can therefore be perceived as approximately true color. In addition, this configuration results in an approximately equal brightness of fluorescent and non-fluorescent regions of the object.

Example with respect to the fourth exemplary embodiment

Figure 10:
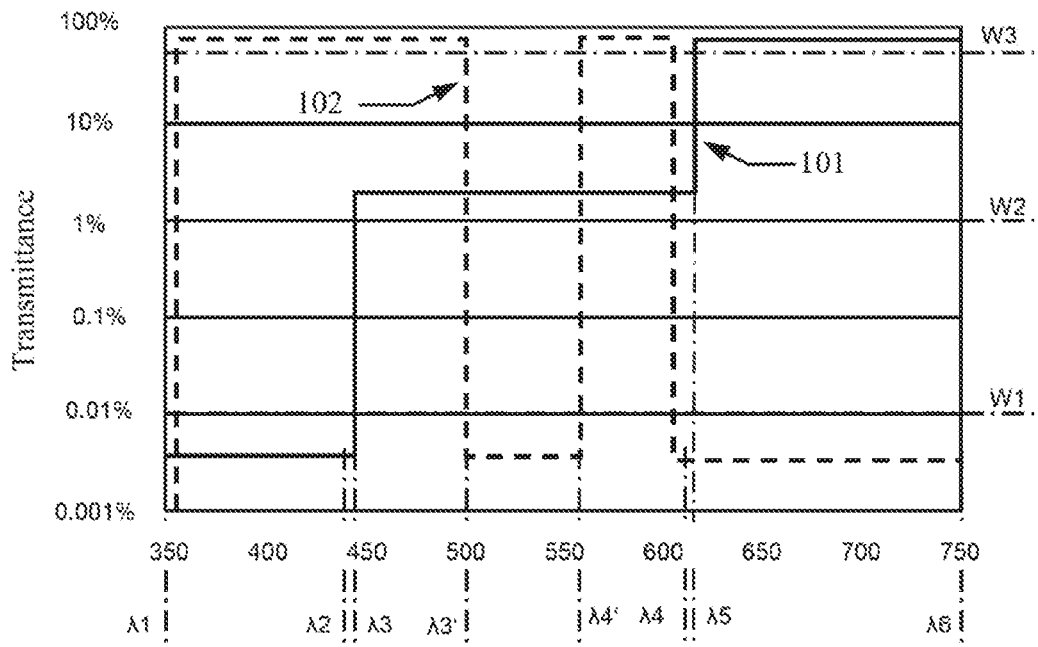
FIG. 10 shows the wavelength-dependent transmittance of an observation filter according to the fourth exemplary embodiment.

FIG. 10 shows the wavelength-dependent transmittance 101 of an observation filter 23 (solid line) and the wavelength-dependent transmittance 102 of an illumination filter 9 (dashed line) in accordance with the fourth embodiment. The observation filter of the example with respect to the fourth exemplary embodiment corresponds to the observation filter of the example with respect to the third exemplary embodiment ($\lambda 1$=350 nm, $\lambda 2$=435 nm, $\lambda 3$=440 nm, $\lambda 4$=610 nm, $\lambda 5$=620 nm, and $\lambda 6$=750 nm).

From 360 nm to $\lambda 3'$=500 nm the transmittance 102 of the illumination filter 9 is approximately 95%. From approximately $\lambda 3'$ to approximately $\lambda 4'$=560 nm the transmittance 102 of the illumination filter 9 is approximately 0.005%. From $\lambda 4'$ to approximately $\lambda 4$ the transmittance 102 of the illumination filter 9 is approximately 95%. From approximately $\lambda 4$ to $\lambda 6$ the transmittance 102 of the illumination filter 9 is approximately 0.005%. Furthermore, it holds true that W1=0.01%, W2=1%, and W3=80%.

The illumination filter and the observation filter together have substantially the same effect as the observation filter of the example with respect to the fifth exemplary embodiment. The observation filter suppresses the first light reflected at the object 13, said first light having a high intensity substantially only between $\lambda 1$ and $\lambda 2$ and passing through the illumination filter substantially without being damped. Furthermore, the second light reflected at the object 13 is restricted by the illumination filter and the observation filter to wavelengths lying substantially only between $\lambda 3$ and $\lambda 3'$. Furthermore, the third light reflected at the object 13 is restricted by the illumination filter and the observation filter to wavelengths lying substantially only between $\lambda 4'$ and $\lambda 4$. Light in the wavelength range from $\lambda 3'$ to $\lambda 4'$ is effectively suppressed by the illumination filter and the observation filter. Non-fluorescent regions of the object 13 can therefore be observed as approximately true color. Furthermore, the fluorescent light emanating from the object 13 and having a high intensity substantially only between $\lambda 5$ and $\lambda 6$ is transmitted by the observation filter 23, with the result that fluorescent regions of the object 13 can be observed with reddish color valences.

Figure 11:
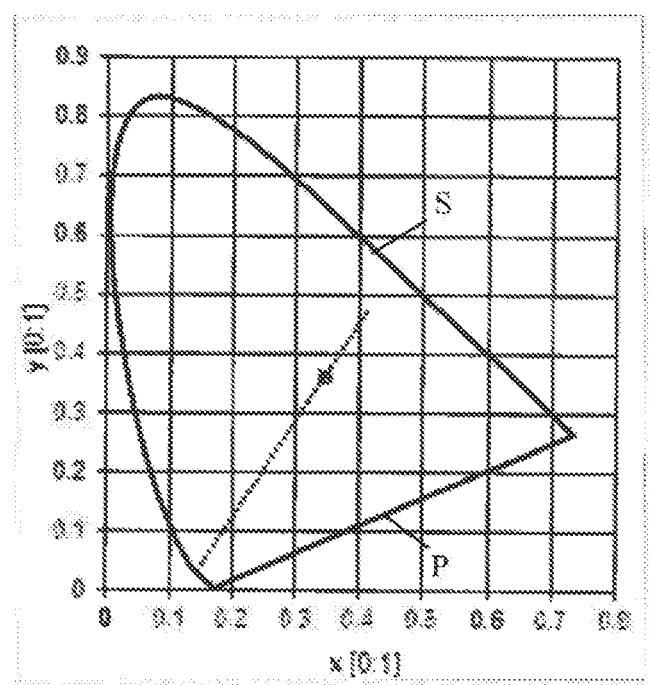
FIG. 11 shows a CIE 1931 standard chromaticity diagram for elucidating the color valence which can be achieved for a white object by the fourth exemplary embodiment.

FIG. 11 shows the CIE 1931 xy standard chromaticity diagram including the spectrum locus S and the purple boundary P. A hollow circle represents the D50 white point at x=0.3457, y=0.3585. A cross at approximately x=0.35, y=0.36 represents a color valence with which a white object is perceived by the normal observer using the microscopy system in accordance with the fourth exemplary embodiment if the observation filter and the illumination filter are configured as shown in FIG. 10, the maximum spectral intensity of the light generated by the first light source is in each case approximately 10 times the magnitude of the maximum spectral intensity of the light generated by the second light source and the maximum spectral intensity of the light generated by the first light source is approximately 5 times the magnitude of the maximum spectral intensity of the light generated by the third light source. Non-fluorescent regions of the object can therefore be perceived as approximately true color. In addition, this configuration results in an approximately equal brightness of fluorescent and non-fluorescent regions of the object.

Three major advantages are afforded by the individual settability of the intensity 52 of the second light and the intensity 53 of the third light (cf. FIG. 5) and the concrete choice of the transmittance 101 of the observation filter 23 and the transmittance 102 of the illumination filter 9. Firstly, the fluorescent regions and the non-fluorescent regions can be perceived as almost equally bright by virtue of the intensity of the light sources being set accordingly. Furthermore, the light sources here can be operated in their stable emission range since the light generated by the second and third light sources is damped to a sufficiently great extent by the observation filter 23 and the illumination filter 9. Finally, as a result of the individual settability of the intensities of the second and third light, the color rendering of the non-fluorescent regions can be set such that the non-fluorescent regions can be observed as approximately true color.

The dashed line depicted in FIG. 11 represents the colors of the non-fluorescent regions of the object which can be obtained by variation of the ratio between (a maximum of) the intensity 52 of the second light and (a maximum of) the intensity 53 of the third light. In this way, typically, a white point different from D50 can also be set.

Example with Respect to the Fifth Exemplary Embodiment

Figure 12:
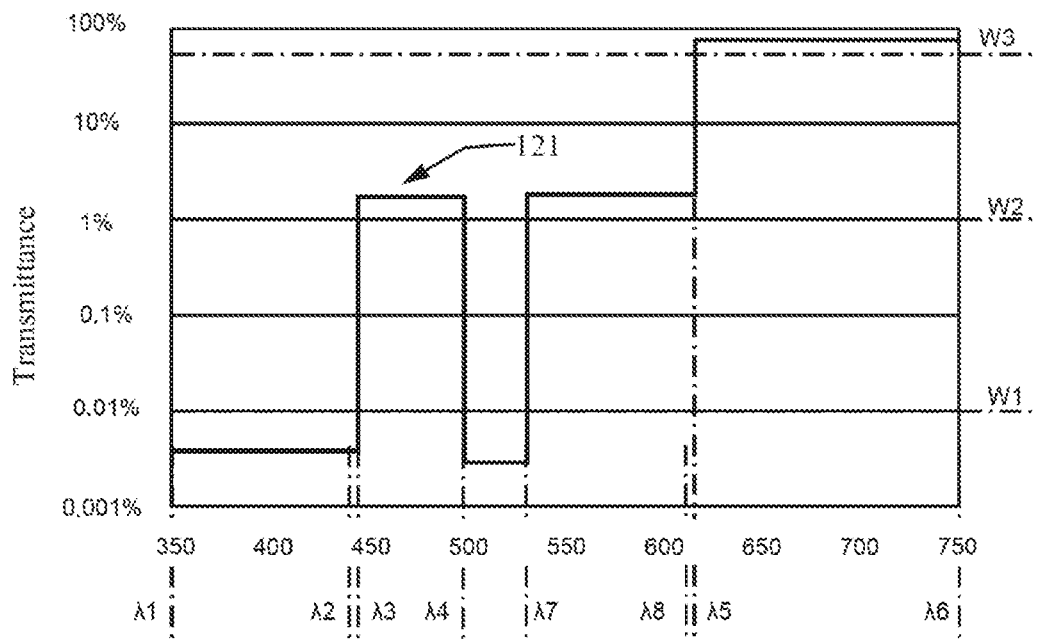
FIG. 12 shows the wavelength-dependent transmittance of an illumination filter and of an observation filter according to the fifth exemplary embodiment.

FIG. 12 shows the wavelength-dependent transmittance 121 of an observation filter 23 in accordance with the fifth exemplary embodiment. From $\lambda 1$=350 nm to $\lambda 2$=435 nm the transmittance 121 is approximately 0.005%. From $\lambda 3$=440 nm to $\lambda 4$=500 nm the transmittance 121 is approximately 2%. From approximately $\lambda 4$ to approximately $\lambda 7$ the transmittance 121 is approximately 0.005%. From $\lambda 7$=535 nm to $\lambda 8$=610 nm the transmittance 121 is approximately 2%. From $\lambda 5$=620 nm to $\lambda 6$=750 nm the transmittance 121 is approximately 95%. Furthermore, it holds true that W1=0.01%, W2=1%, and W3=80%.

Accordingly, the observation filter 23 suppresses the first light reflected at the object 13, said first light having a high intensity substantially only between $\lambda 1$ and $\lambda 2$. Furthermore, the fluorescent light emanating from the object 13, said second light having a high intensity substantially only between $\lambda 3$ and $\lambda 4$, is transmitted by the observation filter 23. Furthermore, the third light reflected at the object 13 is transmitted efficiently by the observation filter 23 substantially only between $\lambda 7$ and $\lambda 8$. Non-fluorescent regions of the object 13 can therefore be observed as approximately true color. Furthermore, the fluorescent light emanating from the object 13, said fluorescent light having a high intensity substantially only between $\lambda 5$ and $\lambda 6$ is transmitted by the observation filter 23, with the result that fluorescent regions of the object 13 can be observed as reddish color valences.

The advantages of the example with respect to the third exemplary embodiment can be afforded by the individual settability of the intensities of the first, second, and third light (cf. FIG. 5), wherein an even better settability of the true color rendering of the non-fluorescent regions is achieved on account of the more pronounced spectral separation of second and third light reflected at the object 13 in comparison with the third exemplary embodiment. In addition, the second and third light sources can be operated with a higher power in comparison with the example with respect to the second exemplary embodiment, which in turn improves the stability of the light spectra generated. Moreover, an illumination filter is not required.

Figure 13:
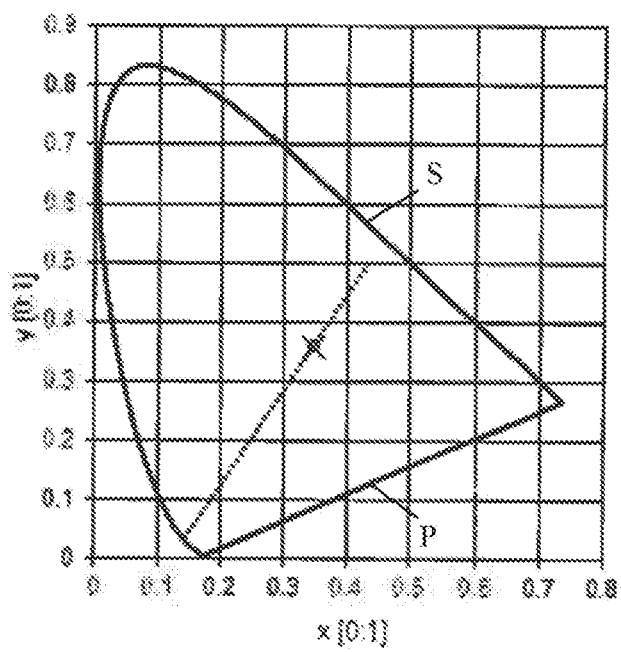
FIG. 13 shows a CIE 1931 standard chromaticity diagram for elucidating the color valence which can be achieved for a white object by the fifth exemplary embodiment.

FIG. 13 shows the CIE 1931 xy standard chromaticity diagram including the spectrum locus S and the purple boundary P. A hollow circle represents the D50 white point at x=0.3457, y=0.3585. A cross at approximately x=0.34, y=0.35 represents a color valence with which a white object is perceived by the normal observer using the microscopy system in accordance with the fifth exemplary embodiment if the observation filter is configured as shown in FIG. 12, the maximum spectral intensity of the light generated by the first light source is in each case approximately 10 times the magnitude of the maximum spectral intensity of the light generated by the second light source and the maximum spectral intensity of the light generated by the first light source is approximately 6 times the magnitude of the maximum spectral intensity of the light generated by the third light source. Non-fluorescent regions of the object can therefore be perceived as approximately true color. In addition, this configuration results in an approximately equal brightness of fluorescent and non-fluorescent regions of the object.

The dashed line depicted in FIG. 13 represents the colors of the non-fluorescent regions of the object which can be obtained by variation of the ratio between (a maximum of) the intensity 52 of the second light and (a maximum of) the intensity 53 of the third light. In this way, typically, a white point different from D50 can also be set.

Example with Respect to the Sixth Exemplary Embodiment

Figure 14:
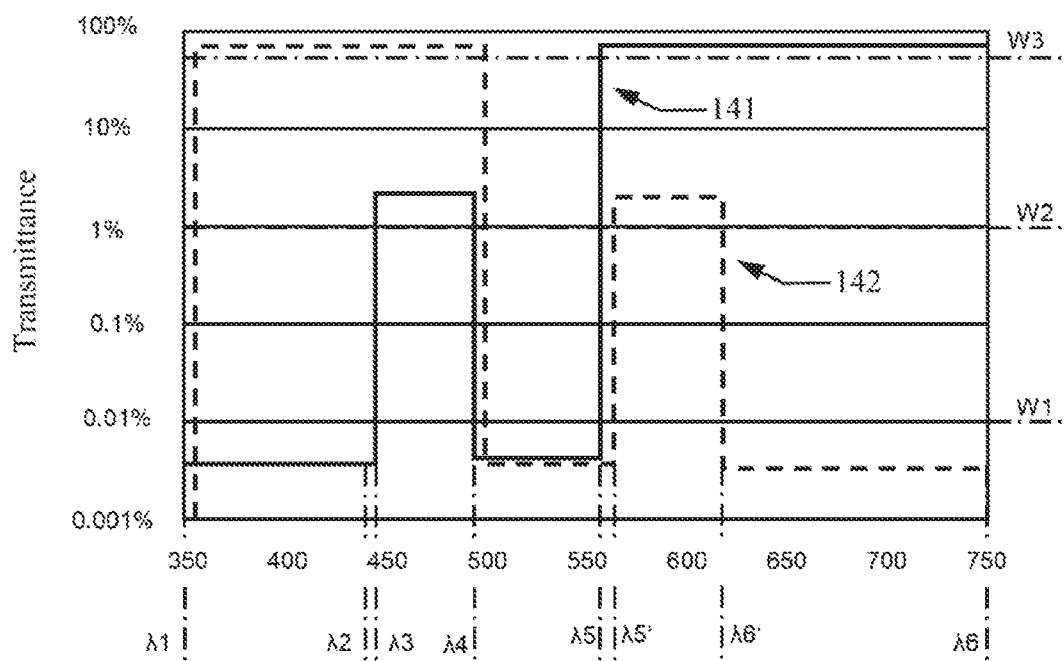
FIG. 14 shows the wavelength-dependent transmittance of an illumination filter and of an observation filter according to the sixth exemplary embodiment.

FIG. 14 shows the wavelength-dependent transmittance 141 of an observation filter 23 (solid line) and the wavelength-dependent transmittance 142 of an illumination filter 9 (dashed line) in accordance with the sixth exemplary embodiment.

From $\lambda 1=350$ nm to $\lambda 2=430$ nm the transmittance 141 of the observation filter 23 is approximately 0.005%. From $\lambda 3=435$ nm to $\lambda 4=500$ nm the transmittance 141 of the observation filter 23 is approximately 2%. From approximately $\lambda 4$ to $\lambda 5=560$ nm the transmittance 141 of the observation filter 23 is approximately 0.005%. From $\lambda 5$ to $\lambda 6=750$ nm the transmittance 141 of the observation filter 23 is approximately 95%. Furthermore, it holds true that: W1=0.01%; W2=1%; and W3=80%.

From 360 nm to approximately $\lambda 4$ the transmittance 142 of the illumination filter 9 is approximately 95%. From approximately $\lambda 4$ to approximately $\lambda 5'=565$ nm the transmittance 142 of the illumination filter 9 is approximately 0.005%. From $\lambda 5'$ to approximately $\lambda 6'=620$ nm the transmittance 142 of the illumination filter 9 is approximately 2%. From approximately $\lambda 6'$ to $\lambda 6$ the transmittance 142 of the illumination filter 9 is approximately 0.005%.

The illumination filter and the observation filter of the example with respect to the sixth exemplary embodiment together have substantially the same effect as the illumination filter and the observation filter of the example with respect to the fifth exemplary embodiment. The observation filter 23 suppresses the first light reflected at the object 13, said first light having a high intensity substantially only between $\lambda 1$ and $\lambda 2$ and passing through the illumination filter 9 substantially without being damped. Furthermore, the second light reflected at the object 13 is restricted by the illumination filter and the observation filter to wavelengths lying substantially only between $\lambda 3$ and $\lambda 4$. Furthermore, the third light reflected at the object 13 is restricted by the illumination filter and the observation filter to wavelengths lying substantially only between $\lambda 5'$ and $\lambda 6'$. Light in the wavelength range from approximately $\lambda 4$ to $\lambda 5$ is effectively suppressed by the illumination filter and the observation filter. Non-fluorescent regions of the object 13 can therefore be observed as approximately true color. Furthermore, the fluorescent light emanating from the object 13 and having a high intensity substantially only between $\lambda 6'$ and $\lambda 6$ is transmitted by the observation filter 23, with the result that fluorescent regions of the object 13 can be observed with reddish color valences.

Example with Respect to the Seventh Exemplary Embodiment

Figure 15:
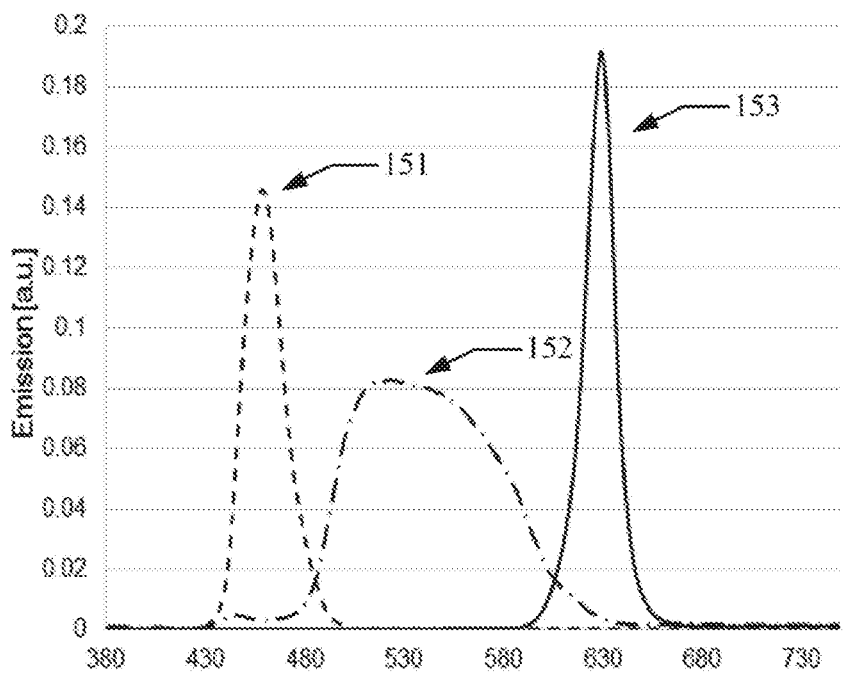
FIG. 15 shows illumination light spectra of three light sources according to a seventh exemplary embodiment.

FIG. 15 shows illumination light spectra of a first, a second, and a third light source according to a seventh exemplary embodiment.

The first light source serves substantially exclusively for exciting the fluorescent dye fluorescein, i.e. for visualizing fluorescent regions of the object. The second and third light sources serve substantially exclusively for visualizing non-fluorescent regions of the object.

The first light source generates an illumination light spectrum 151 having a spectral emission maximum in the range of 440 nm to 470 nm and a full width at half maximum in the range of 20 nm to 50 nm. Below approximately 430 nm and above approximately 500 nm, the intensity of the first light generated by the first light source is at most 1% of its maximum spectral intensity. The first light source is a light-emitting diode, for example.

The second light source generates an illumination light spectrum 152 having a spectral emission maximum in the range of 500 nm to 560 nm and a full width at half maximum in the range of 40 nm to 110 nm. Below approximately 430 nm and above approximately 650 nm, the intensity of the second light generated by the second light source is at most 1% of its maximum spectral intensity. The second light source is a light-emitting diode, for example.

The third light source generates an illumination light spectrum 153 having a spectral emission maximum in the range of 610 nm to 640 nm and a full width at half maximum in the range of 10 nm to 20 nm. The third light source is a light-emitting diode, for example.

Figure 16:
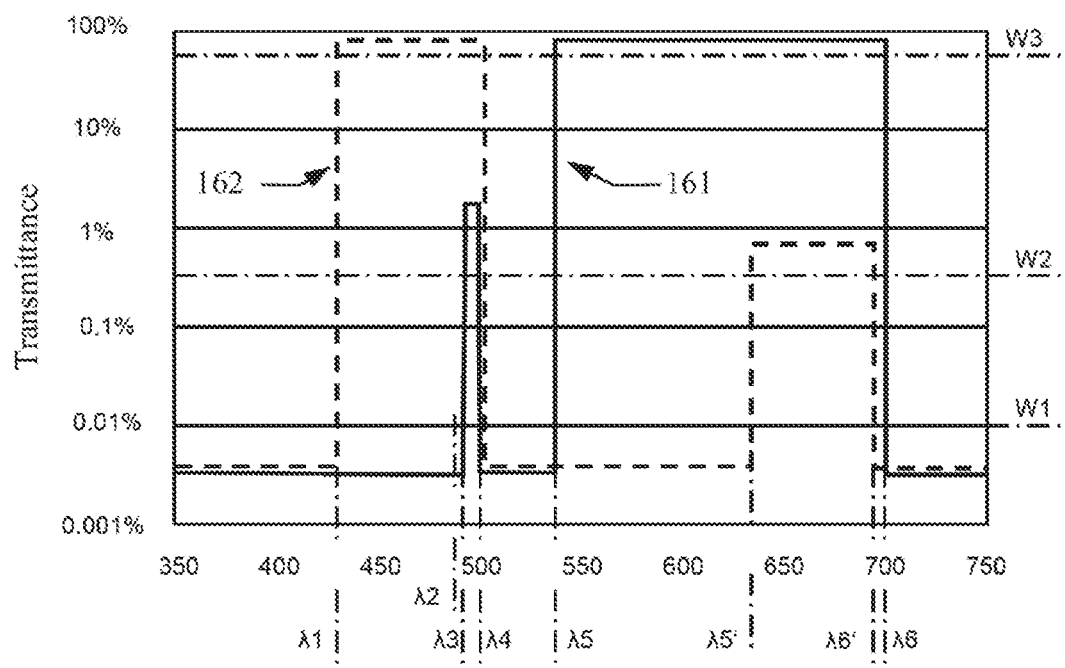
FIG. 16 shows the wavelength-dependent transmittance of an illumination filter and of an observation filter according to the seventh exemplary embodiment.

FIG. 16 shows the wavelength-dependent transmittance 161 of an observation filter 23 (solid line) and the wavelength-dependent transmittance 162 of an illumination filter 9 (dashed line) in accordance with the seventh exemplary embodiment.

From $\lambda 1=420$ nm to $\lambda 2=480$ nm the transmittance 161 of the observation filter 23 is approximately 0.005%. From $\lambda 3=490$ nm to $\lambda 4=500$ nm the transmittance 161 of the observation filter 23 is approximately 2%. From approximately $\lambda 4$ to approximately $\lambda 5=540$ nm the transmittance 161 of the observation filter 23 is approximately 0.005%. From $\lambda 5$ to $\lambda 6=700$ nm the transmittance 161 of the observation filter 23 is approximately 95%. From approximately $\lambda 6$ to 750 nm the transmittance 161 of the observation filter 23 is approximately 0.005%. Furthermore, it holds true that W1=0.01%, W2=0.5%, and W3=80%.

From 350 nm to approximately $\lambda 1$ the transmittance 162 of the illumination filter 9 is approximately 0.005%. From $\lambda 1$ to approximately $\lambda 4$ the transmittance 162 of the illumination filter 9 is approximately 95%. From approximately $\lambda 4$ to approximately $\lambda 5'=630$ nm the transmittance 162 of the illumination filter 9 is approximately 0.005%. From approximately $\lambda 5'$ to $\lambda 6'=690$ nm the transmittance 162 of the illumination filter 9 is approximately 0.08%. From approximately λ6' to 750 nm the transmittance 162 of the illumination filter 9 is approximately 0.005%.

Accordingly, the observation filter 23 suppresses the first light reflected at the object 13, said first light having a high intensity substantially only between λ1 and λ2. Furthermore, the second light is suppressed by the illumination filter 9 above λ4. The proportion of the second light between λ3 and λ4 is reflected at the object 13 and transmitted by the observation filter 23 and thus contributes to the visualization of the non-fluorescent regions. Furthermore, the third light is suppressed by the illumination filter 9 below λ5'. The proportion of the third light between λ5' and λ6' is reflected at the object 13 and transmitted by the observation filter 23 and thus contributes to the visualization of the non-fluorescent regions. Furthermore, the fluorescent light emanating from the object 13 and having a high intensity substantially only between λ5 and λ5' is transmitted by the observation filter 23, with the result that fluorescent regions of the object 13 can be observed with yellowish color valences.

Three major advantages are afforded by the individual settability of the intensities of the first, second, and third light (cf. FIG. 15) and the concrete choice of the transmittance 161 of the observation filter 23 and the transmittance 162 of the illumination filter 9. Firstly, the fluorescent regions and the non-fluorescent regions can be perceived as almost equally bright by virtue of the intensity of the light sources being set accordingly. Furthermore, the light sources here can be operated in their stable emission range since the light generated by the second and third light sources is damped to a sufficiently great extent by the observation filter 23 and the illumination filter 9. Finally, as a result of the individual settability of the intensities of the second and third light, the color rendering of the non-fluorescent regions can be set such that the non-fluorescent regions can be observed as approximately true color.

Figure 17:
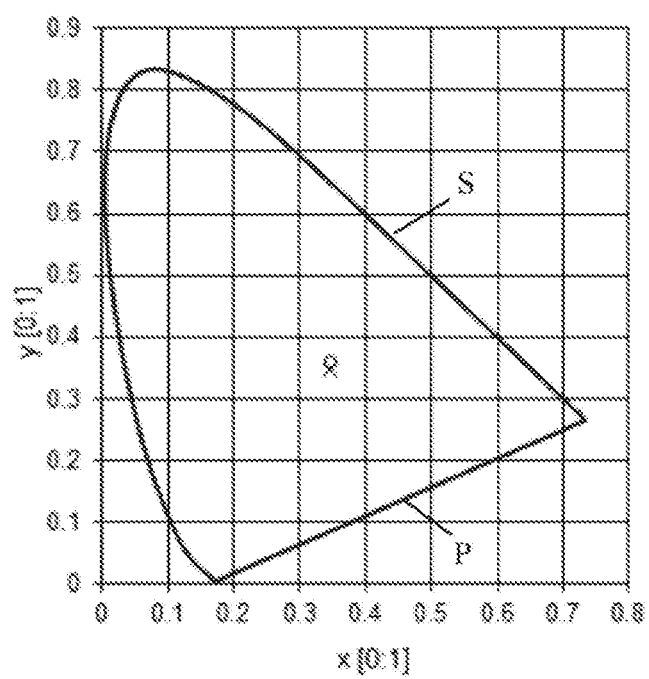
FIG. 17 shows a CIE 1931 standard chromaticity diagram for elucidating the color valence which can be achieved for a white object by the seventh exemplary embodiment.

FIG. 17 shows the CIE 1931 xy standard chromaticity diagram including the spectrum locus S and the purple boundary P. A hollow circle represents the D50 white point at x=0.3457 and y=0.3585. A cross at approximately x=0.35 and y=0.33 represents a color valence with which a white object is perceived by the normal observer using the microscopy system in accordance with the seventh exemplary embodiment if the observation filter and the illumination filter are configured as shown in FIG. 16, the maximum spectral intensity of the light generated by the first light source is in each case approximately 3 times the magnitude of the maximum spectral intensity of the light generated by the second light source and the maximum spectral intensity of the light generated by the first light source is approximately 5 times the magnitude of the maximum spectral intensity of the light generated by the third light source. Non-fluorescent regions of the object can therefore be perceived as approximately true color. In addition, this configuration results in an approximately equal brightness of fluorescent and non-fluorescent regions of the object.

Third Aspect

One example of a microscopy method in accordance with the third aspect is described with reference to FIGS. 18 and 19. The method can be carried out by the microscopy system in accordance with FIG. 1 and includes generating illumination light, directing the illumination light generated onto an object 13 and generating an observation beam path 22, which images the object 13 into an image plane 19, wherein an observation filter 23 is arranged in the observation beam path 22.

Figure 18:
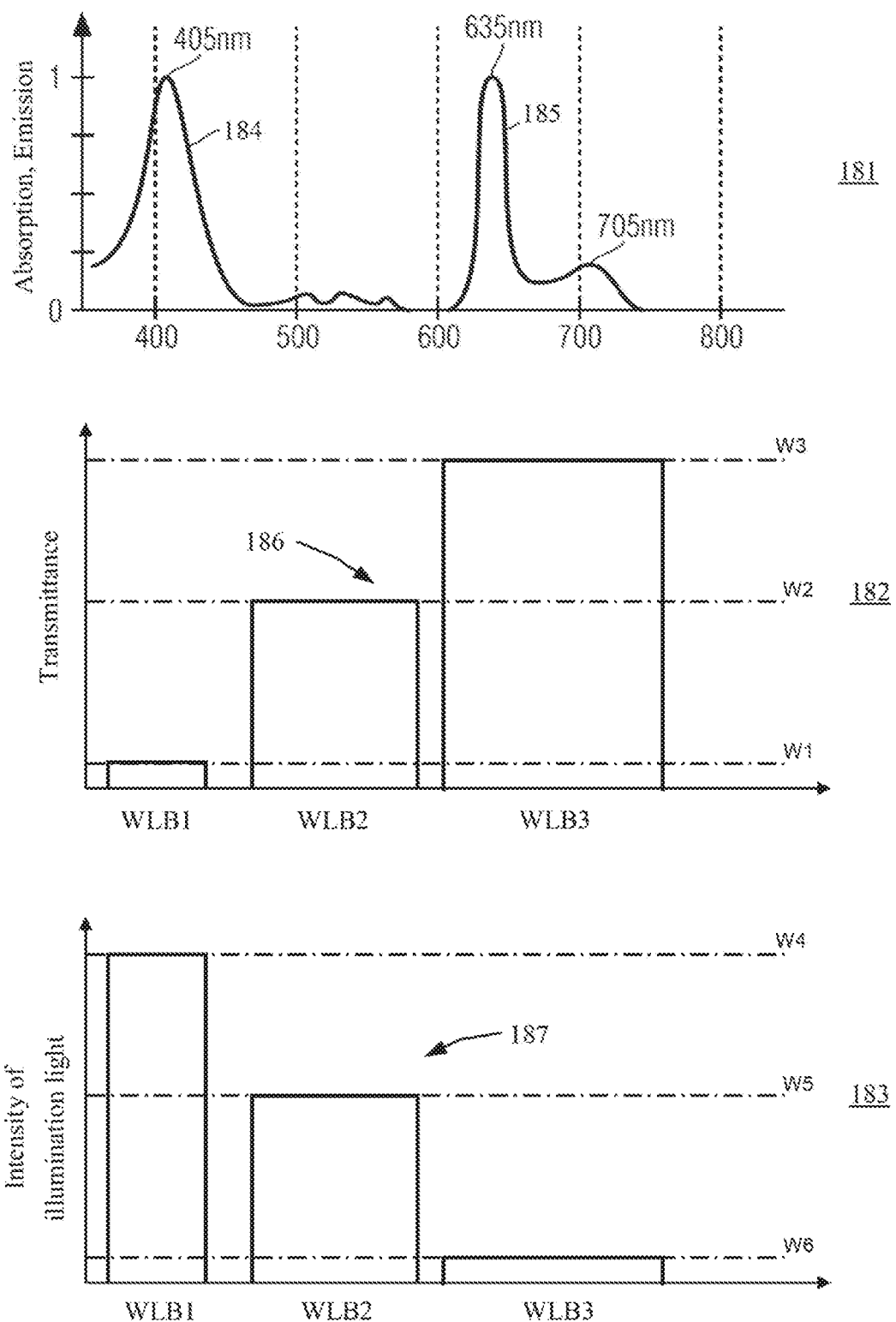
FIG. 18 shows one exemplary embodiment of a microscopy system for matching the brightness of fluorescent and non-fluorescent object regions for protoporphyrin IX.

FIG. 18 shows one exemplary configuration of a microscopy system for carrying out the microscopy method for protoporphyrin IX. A diagram 181 in FIG. 18 shows the wavelength-dependent absorption spectrum 184 of PpIX and the wavelength-dependent emission spectrum 185 of PpIX, in each case normalized to their respective maximum values; also see the description concerning FIG. 2. A diagram 182 in FIG. 18 shows the wavelength-dependent transmittance 186 of the observation filter 23 for the same wavelength portion as in diagram 181. A diagram 183 shows the wavelength-dependent intensity 187 of the illumination light directed onto the object 13 for the same wavelength portion as in diagram 181.

A first value W1 represents a mean value of the transmittance 186 of the observation filter 23 over a first wavelength range WLB1. A second value W2 represents a mean value of the transmittance 186 of the observation filter 23 over a second wavelength range WLB2. A third value W3 represents a mean value of the transmittance 186 of the observation filter 23 over a third wavelength range WLB3. The first value W1 is less than the second value W2. The second value W2 is less than the third value W3.

A fourth value W4 represents a mean value of the intensity 187 of the illumination light over the first wavelength range WLB1. A fifth value W5 represents a mean value of the intensity 187 of the illumination light over the second wavelength range WLB2. A sixth value W6 represents a mean value of the intensity 187 of the illumination light over the third wavelength range WLB3. The fourth value W4 is larger than the fifth value W5. The fifth value W5 is larger than the sixth value W6.

The first, second, and third wavelength ranges do not overlap one another and lie in each case between 350 nm and 1000 nm. In the example shown, the first wavelength range WLB1 extends from approximately 370 nm to 430 nm, the second wavelength range WLB2 extends from approximately 470 nm to 580 nm, and the third wavelength range WLB3 extends from approximately 600 nm to 750 nm.

What is achieved with the values for the ratios between the first to sixth values as indicated with regard to the third aspect is that non-fluorescent regions of the object can be observed by light in the first wavelength range WLB1 and in the second wavelength range WLB2, while fluorescent light can be observed by light in the third wavelength range WLB3. Moreover, what is achieved on the basis of the indicated ratios between the first to sixth values is that non-fluorescent regions and fluorescent regions can be perceived as approximately equally bright. What is furthermore achieved is that the non-fluorescent regions can be perceived as approximately true color.

Figure 19:
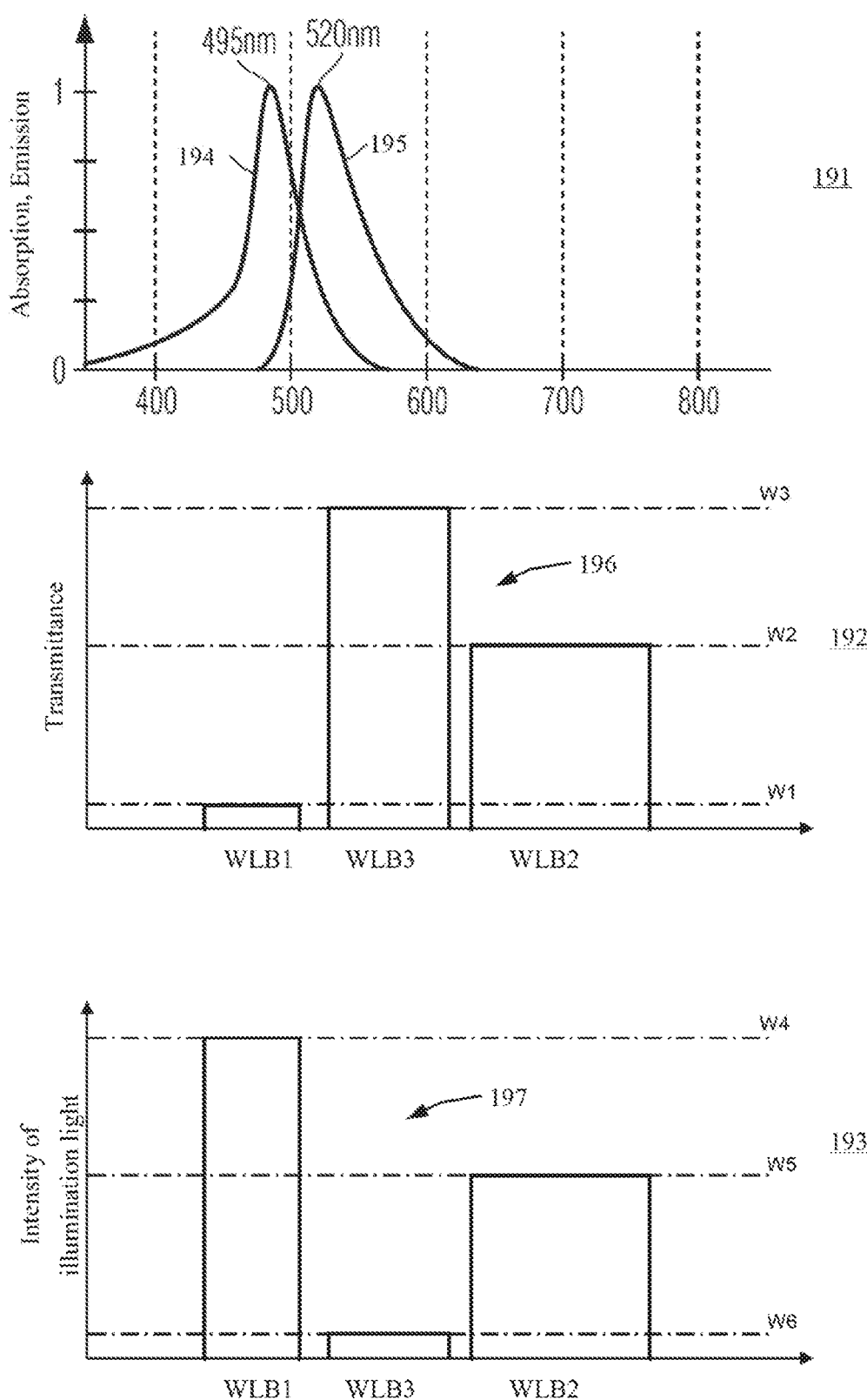
FIG. 19 shows one exemplary embodiment of a microscopy system for matching the brightness of fluorescent and non-fluorescent object regions for fluorescein.

FIG. 19 shows one exemplary configuration of a microscopy system for carrying out the microscopy method for fluorescein. A diagram 191 in FIG. 19 shows the wavelength-dependent absorption spectrum 194 of fluorescein and the wavelength-dependent emission spectrum 195 of Fluorescein, in each case normalized to their respective maximum values; also see the description concerning FIG. 2. A diagram 192 in FIG. 19 shows the wavelength-dependent transmittance 196 of the observation filter 23 for the same wavelength portion as in diagram 191. A diagram 193 shows the wavelength-dependent intensity 197 of the illumination light directed onto the object 13 for the same wavelength portion as in diagram 191.

In the example shown, the first wavelength range WLB1 extends from approximately 440 nm to 500 nm, the second wavelength range WLB2 extends from approximately 640 nm to 750 nm and the third wavelength range WLB3 extends from approximately 520 nm to 620 nm.

One example of an alternative microscopy method in accordance with the third aspect is described with reference to FIGS. 20 to 23. The method can be carried out by the microscopy system in accordance with FIG. 1 and includes generating illumination light, directing the illumination light generated onto an object 13 and generating an observation beam path 22, which images the object 13 into an image plane 19, wherein an observation filter 23 is arranged in the observation beam path 22.

FIG. 20 shows a schematic illustration of a projected image of the object 13 into the image plane 19. The projected image of the object 13 includes first locations 201, second locations 202, and third locations 203. The light in the observation beam path 22 which generates the projected image in the image plane 19 has at the first locations 201 color valences which lie in a first color valence range 211. The light in the observation beam path 22 which generates the projected image in the image plane 19 has at the second locations 202 color valences which lie in a second color valence range 212. The light in the observation beam path 22 which generates the projected image in the image plane 19 has at the third locations 203 color valences which lie outside the first color valence range 211 and outside the second color valence range 212.

FIG. 22 shows a CIE 1931 standard chromaticity diagram for elucidating the first color valence range 211, the second color valence range 212 and the third color valence range 213. The first color valence range 211 includes red color valences, that is to say the color valences of strong fluorescence of the fluorescent dye PpIX. The second color valence range 212 includes blue color valences, that is to say the color valences at which the fluorescent dye PpIX can be excited efficiently. The third color valence range 213 encompasses the remaining color valences of the visible color valences which are not contained in the first and second color valence ranges. An arrow 214 shows the smallest color difference between the first color valence range 211 and the second color valence range 212.

In accordance with the alternative microscopy method, the illumination light is generated such that a ratio of a first characteristic value to a second characteristic value has a value within a predetermined delimited value range. The first characteristic value represents a value of a characteristic variable for the intensity (or the brightness or the luminous flux or the like) of the light in the observation beam path 22 at the first locations 201. The second characteristic value represents the same characteristic variable in relation to the light in the observation beam path 22 at the second locations 202.

By way of example, the first characteristic value represents a mean value of the intensity of the light in the observation beam path 22 at the first locations 201, and the second characteristic value represents the mean value of the intensity of the light in the observation beam path 22 at the second locations 202. If the illumination light is generated such that the ratio of the first characteristic value to the second characteristic value lies in the value range of 20/1 to 1/20 or a narrower value range, the first locations 201, that is to say the fluorescent regions of the object 13, and the second locations 202, that is to say the non-fluorescent regions of the object 13, can be perceived as approximately equally bright.

One example of the microscopy method is explained below with reference to FIG. 23. The example relates to a method for controlling the microscopy system from FIG. 1, wherein the brightness of fluorescent and non-fluorescent regions of the object 13 is matched.

In step S1, an image of the object 13 in the image plane 19 is recorded by the color image detector 20. The image is an image of the projected image of the object 13 generated through the observation beam path 22 in the image plane 19.

FIG. 21 shows a schematic illustration of an image 205 recorded in step S1, which is an image of the projected image of the object 13 in the image plane 19 shown in FIG. 20. The image 205 includes a plurality of image points 206.

In step S2, following step Si, first image points 207 are determined from the image points 206. The first image points 207 correspond to the first locations 201. The image 205 has at the first image points 207 color valences which lie within the first color valence range 211. The first image points 207 are determined for example by comparing the color valences at the image points 206 of the image 205 with the predetermined first color valence range 211.

In step S3, following step S1, second image points 208 are determined from the image points 206. The second image points 208 correspond to the second locations 202. The image 205 has at the second image points 208 color valences which lie within the second color valence range 212. The second image points 208 are determined for example by comparing the color valences at the image points 206 of the image 205 with the predetermined second color valence range 212.

In step S4, following step S2, the first characteristic value is determined on the basis of the intensity of the image 205 at the first image points 207. By way of example, the mean value or the maximum value of the intensity at the first image points 207 is determined.

In step S5, following step S3, the second characteristic value is determined on the basis of the intensity of the image 205 at the second image points 208. By way of example, the mean value or the maximum value of the intensity at the second image points 208 is determined.

In step S6, which follows when steps S4 and S5 are concluded, the illumination light is set depending on the first and second characteristic values or depending on the intensity of the light in the observation beam path 22 in the image plane 19 at the first and second locations 201, 202 or depending on the intensity at the first and second image points 207 and 208. That is to say that the wavelength-dependent intensity distribution of the illumination light is changed. In this case, the illumination light is generated such that the above-described ratio between the first and second characteristic values has a value within the predetermined value range.

Figure 23:
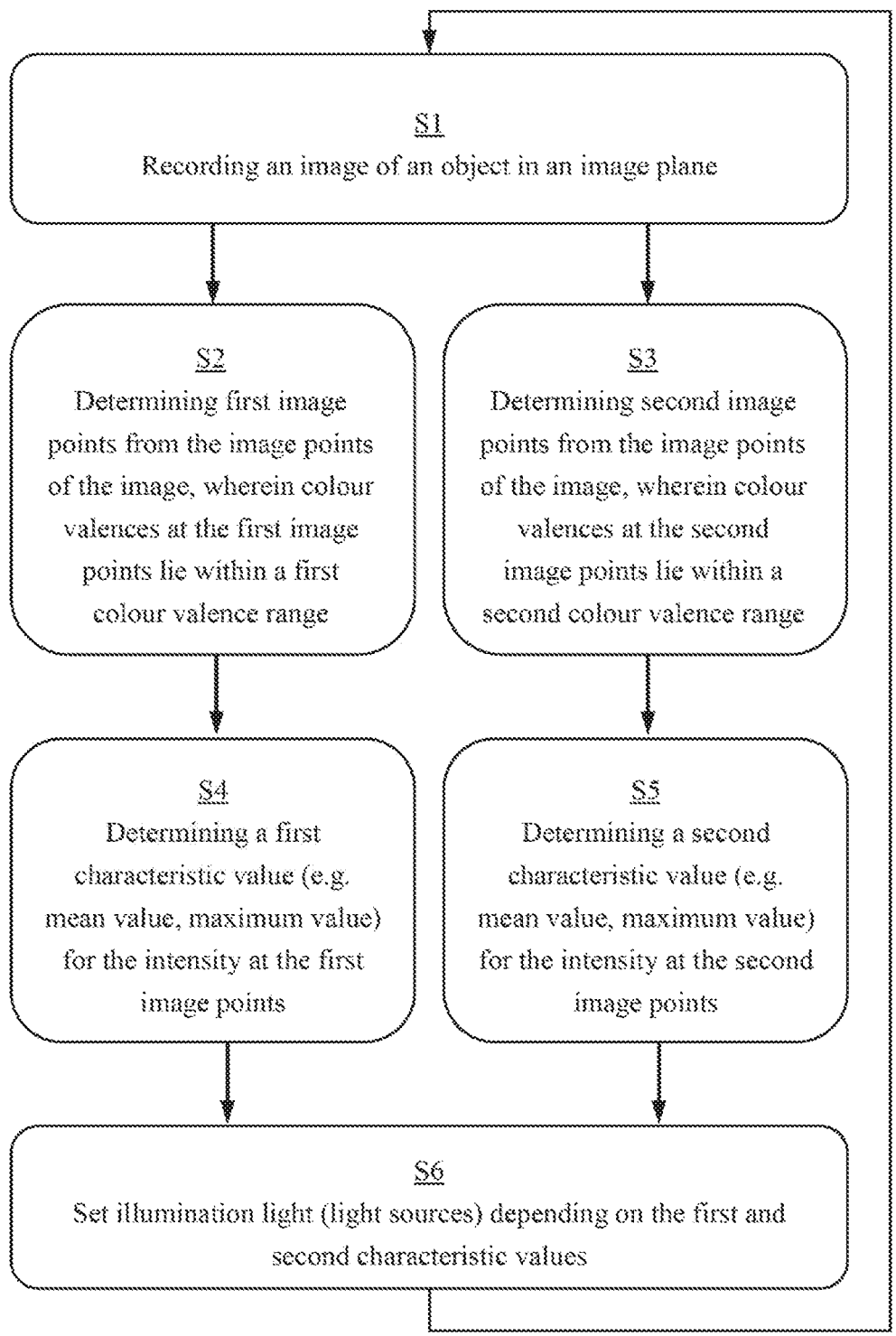
FIG. 23 shows a microscopy method for matching the brightness of fluorescent and non-fluorescent object regions according to an exemplary embodiment.

The method can be carried out repeatedly, which is illustrated by an arrow from step S6 to step S1 in FIG. 23.

It is understood that the foregoing description is that of the exemplary embodiments of the disclosure and that various changes and modifications may be made thereto without departing from the spirit and scope of the disclosure as defined in the appended claims.

What is claimed is:

1. A microscopy system for simultaneously observing fluorescent and non-fluorescent regions of an object, the microscopy system comprising:
a microscopy optical unit configured to image an object plane through an observation beam path onto an image plane;
an observation filter arrangeable in the observation beam path, a transmittance of the observation filter from $\lambda 1$ to $\lambda 2$ being less than W1, from $\lambda 3$ to $\lambda 4$ being larger than W2, and from $\lambda 5$ to $\lambda 6$ being larger than W3, $\lambda 1$, $\lambda 2$, $\lambda 3$, $\lambda 4$, $\lambda 5$, and $\lambda 6$ being wavelengths for which 350 nm $<\lambda 1<\lambda 2 \leq \lambda 3<\lambda 4 \leq \lambda 5<\lambda 6<750$ nm holds true, and W1, W2, and W3 being values for which $0<W1<W2<W3<1$ holds true;

a first light source configured to generate first light having wavelengths of between $\lambda 1$ and $\lambda 2$ and to direct the first light onto the object plane;

a second light source configured to generate second light having wavelengths of between $\lambda 3$ and $\lambda 4$ and to direct the second light onto the object plane; and a controller configured to control the first light source and/or the second light source individually, as a result of which a ratio of the intensity of the first light to the intensity of the second light is variable.

2. The microscopy system according to claim 1, wherein:
350 nm$<\lambda 1<$400 nm; and/or
410 nm$<\lambda 2<$440 nm; and/or
440 nm$<\lambda 3<$460 nm; and/or
480 nm$<\lambda 4<$620 nm; and/or
530 nm$<\lambda 5<$620 nm; and/or
650 nm$<\lambda 6<$750 nm; and/or
W1=0.1% or W1=0.01%; and/or
W2=1%; and/or
W3=90%.

3. The microscopy system according to claim 1, wherein:
the first light source is configured to generate a spectral intensity distribution having a spectral emission maximum in the range of 400 nm to 420 nm and a full width at half maximum in the range of 10 nm to 20 nm; and/or
the second light source is configured to generate a spectral intensity distribution having a spectral emission maximum in the range of 440 nm to 470 nm and the full width at half maximum in the range of 20 nm to 50 nm.

4. The microscopy system according to claim 1, wherein:
480 nm$<\lambda 4<$520 nm; and/or
the transmittance of the observation filter from $\lambda 3$ to $\lambda 4$ is larger than 10% and less than 60%; and/or
the transmittance of the observation filter from $\lambda 2+\Delta$ to $\lambda 3\Delta$ and from $\lambda 4+\Delta$ to $\lambda 5-\Delta$ is less than 0.1 times W1 and 3 nm$\leq\Delta\leq$10 nm; and/or
the intensity of the first light above $\lambda 3$ is at most 1% of its maximum spectral intensity; and/or
the intensity of the second light below $\lambda 2$ and above $\lambda 5$ is at most 1% of its maximum spectral intensity.

5. The microscopy system according to claim 1, further comprising:
a third light source configured to generate third light having wavelengths of between $\lambda 7$ and $\lambda 8$ and to direct the third light onto the object plane, and
wherein $\lambda 7$ and $\lambda 8$ are wavelengths and $\lambda 2<\lambda 7<\lambda 8<\lambda 5$.

6. The microscopy system according to claim 5, wherein the third light source is configured to generate a spectral intensity distribution having a spectral emission maximum in the range of 500 nm to 560 nm and a full width at half maximum in the range of 40 nm to 110 nm.

7. The microscopy system according to claim 5, wherein:
the transmittance of the observation filter from $\lambda 3$ to $\lambda 6$ is larger than W3; and/or
the intensity of the first light above $\lambda 3$ is at most 1% of its maximum spectral intensity; and/or
the intensity of the second light below $\lambda 2$ and above $\lambda 5$ is at most 1% of its maximum spectral intensity; and/or
the intensity of the third light below $\lambda 2$ and above $\lambda 5$ is at most 1% of its maximum spectral intensity.

8. The microscopy system according to claim 5, wherein:
the transmittance of the observation filter from $\lambda 3$ to $\lambda 4$ is less than 5% and 600 nm $<\lambda 4<\lambda 5<$620 nm; and/or
the intensity of the first light above $\lambda 3$ is at most 1% of its maximum spectral intensity; and/or the intensity of the second light below $\lambda 2$ and above $\lambda 5$ is at most 1% of its maximum spectral intensity; and/or
the intensity of the third light below $\lambda 2$ and above $\lambda 5$ is at most 1% of its maximum spectral intensity.

9. The microscopy system according to claim 8, further comprising:
an illumination filter arrangeable between light sources and the object plane, and wherein:
the transmittance of the illumination filter from $\lambda 1$ to $\lambda 3'$ and from $\lambda 4'$ to $\lambda 4$ is larger than W3, and from $\lambda 3'+\Delta$ to $\lambda 4'-\Delta$ and from $\lambda 4+\Delta$ to $\lambda 6$ is less than W1,
3 nm$\leq\Delta\leq$10 nm;
$\lambda 3'$ and $\lambda 4'$ are wavelengths and $\lambda 3<\lambda 3'<\lambda 4'<\lambda 4$ and 480 nm$<\lambda 3'<$520 nm and 520 nm$<\lambda 4'<$550 nm and $\lambda 4'-\lambda 3'>$20 nm; and/or
the intensity of the first light above $\lambda 3$ is at most 1% of its maximum spectral intensity; and/or
the intensity of the second light below $\lambda 2$ and above $\lambda 4'$ is at most 1% of its maximum spectral intensity; and/or
the intensity of the third light between $\lambda 4'$ and $\lambda 4$ is significant and below $\lambda 3'$ and above $\lambda 5$ is at most 1% of its maximum spectral intensity.

10. The microscopy system according to claim 5, wherein:
the transmittance of the observation filter from $\lambda 3$ to $\lambda 4$ is less than 5%,
the transmittance of the observation filter from $\lambda 7$ to $\lambda 8$ is larger than W2 and less than 5%,
the transmittance of the observation filter from $\lambda 4+\Delta$ to $\lambda 7-\Delta$ is less than W1,
3 nm$\leq\Delta\leq$10 nm,
$\lambda 7$ and $\lambda 8$ are wavelengths and $\lambda 4<\lambda 7<\lambda 8<\lambda 5$ and 480 nm$<\lambda 4<$520 nm and 520 nm $<\lambda 7<$550 nm and $\lambda 7-\lambda 4>$20 nm and $\lambda 5-\lambda 8<$30 nm, and/or
the intensity of the first light above $\lambda 3$ is at most 1% of its maximum spectral intensity, and/or
the intensity of the second light below $\lambda 2$ and above $\lambda 7$ is at most 1% of its maximum spectral intensity, and/or
the intensity of the third light below $\lambda 4$ and above $\lambda 5$ is at most 1% of its maximum spectral intensity.

11. The microscopy system according to claim 5, wherein:
the transmittance of the observation filter from $\lambda 3$ to $\lambda 4$ is less than 5%,
the transmittance of the observation filter from $\lambda 4+\Delta$ to $\lambda 5-\Delta$ is less than W1,
480 nm$<\lambda 4<$520 nm and 530 nm$<\lambda 5<$560 nm and $\lambda 5-\lambda 4>$20 nm, and/or
the microscopy system further comprises:
an illumination filter arrangeable between light sources and the object plane, wherein:
the transmittance of the illumination filter from $\lambda 1$ to $\lambda 4$ is larger than W3,
the transmittance of the illumination filter from $\lambda 4+\Delta$ to $\lambda 5'-\Delta$ is less than W1,
the transmittance of the illumination filter from $\lambda 5'$ to $\lambda 6'$ is larger than W2 and less than 5%,
the transmittance of the illumination filter from $\lambda 6'$ to $\lambda 6$ is less than W1,
3 nm$\leq\Delta\leq$10 nm, $\lambda 5'$, $\lambda 6'$ are wavelengths and $\lambda 4<\lambda 5'<\lambda 6'<\lambda 6$, and 530 nm$<\lambda 5'<$570 nm and 600 nm$<\lambda 6'<$620 nm, and/or
the intensity of the first light above $\lambda 3$ is at most 1% of its maximum spectral intensity; and/or
the intensity of the second light below $\lambda 2$ and above $\lambda 5$ is at most 1% of its maximum spectral intensity; and/or
the intensity of the third light below $\lambda 4$ and above $\lambda 5$ is at most 1% of its maximum spectral intensity.

12. The microscopy system according to claim 1, wherein the microscopy system has no illumination filter between the object pane and light sources.

13. The microscopy system according to claim 1, further comprising:
a third light source configured to generate third light having wavelengths of between λ5' and λ6' and to direct the third light onto the object plane;
an illumination filter arrangeable between light sources and the object plane, wherein:
the transmittance of the illumination filter from λ1 to λ4 is larger than W3,
the transmittance of the illumination filter from λ5' to λ6' is larger than W2 and less than 5%,
λ5' and λ6' are wavelengths and λ5<λ5'<λ6', and
the transmittance of the observation filter from λ3 to λ4 is less than 5%.

14. The microscopy system according to claim 13, wherein:
the transmittance of the illumination filter from λ4+Δ to λ5'-Δ is less than W1,
3 nm≤Δ≤10 nm, and/or
the transmittance of the illumination filter from λ6' to 750 nm is less than W1, and/or
the transmittance of the observation filter from λ4+Δ to λ5-Δ is less than W1, and 3 nm≤Δ≤10 nm.

15. The microscopy system according to claim 13, wherein:
350 nm<λ1<460 nm; and/or
460 nm<λ2<480 nm; and/or
470 nm<λ3<490 nm; and/or
490 nm<λ4<510 nm; and/or
520 nm<λ5<550 nm; and/or
680 nm<λ6<750 nm; and/or
620 nm<λ5'<650 nm; and/or
680 nm<λ6'<750 nm; and/or
W1=0.1% or W1=0.01%; and/or
W2=0.5%; and/or
W3=90%; and/or
the intensity of the first light above λ5 is at most 1% of its maximum spectral intensity, and/or
the intensity of the second light below λ3 and above λ5' is at most 1% of its maximum spectral intensity, and/or
the intensity of the third light below λ4 is at most 1% of its maximum spectral intensity.

16. The microscopy system according to claim 13, wherein:
the first light source is configured to generate a spectral intensity distribution having a spectral emission maximum in the range of 440 nm to 460 nm and a full width at half maximum in the range of 10 nm to 20 nm; and/or
the second light source is configured to generate a spectral intensity distribution having a spectral emission maximum in the range of 500 nm to 550 nm and the full width at half maximum in the range of 40 nm to 110 nm; and/or
the third light source is configured to generate a spectral intensity distribution having a spectral emission maximum in the range of 600 nm to 640 nm and the full width at half maximum in the range 10 nm to 20 nm.

17. The microscopy system according to claim 1, wherein the controller is configured to set individually the operating current and/or the operating voltage of at least one of light sources to thereby set individually the intensity of light generated by light sources.

18. A method for operating a microscopy system according to claim 1, the method comprising:

generating illumination light and directing illumination light onto an object (13);
generating an observation beam path, which images the object into the image plane, an observation filter being arranged in the observation beam path, the illumination light being generated such that $|\vec{W}-\vec{f}|\leq 0{,}2$, $\vec{W}$ representing a color locus of a white point in the CIE standard chromaticity diagram of the CIE 1931 standard colorimetric system, $\vec{f}$ representing the color locus having coordinates $x_f$ and $y_f$ in the CIE standard chromaticity diagram of the CIE 1931 standard colorimetric system, which are defined by $$x_f = \frac{X}{X+Y+Z} \text{ and } y_f = \frac{Y}{X+Y+Z},$$

X, Y, and Z representing tristimulus values of the CIE 1931 standard colorimetric system which are defined by $$X=k\int I(\lambda)\cdot T(\lambda)\cdot \vec{x}(\lambda)\cdot d\lambda,$$

$$Y=k\int I(\lambda)\cdot T(\lambda)\cdot \vec{y}(\lambda)\cdot d\lambda, \text{ and}$$

$$Z=k\int I(\lambda)\cdot T(\lambda)\cdot \vec{z}(\lambda)\cdot d\lambda,$$

I ($\lambda$) representing the intensity of the illumination light,
T ($\lambda$) representing the transmittance of the observation filter,
$\bar{x}(\lambda)$, $\bar{y}(\lambda)$, and $\bar{z}(\lambda)$ representing the spectral value functions of the CIE 1931 standard colorimetric system, and
k being a constant.

19. The method according to claim 18, wherein:

$$|\vec{W}-\vec{f}|\leq 0.15, \text{ or}$$

$$|\vec{W}-\vec{f}|\leq 0.1.$$

20. A microscopy method, comprising:
generating illumination light and directing illumination light onto an object;
generating an observation beam path, which images the object into an image plane, an observation filter being arranged in the observation beam path,
wherein a first value, which represents a mean value of the transmittance of the observation filter over a first wavelength range, is less than a second value, which represents the mean value of the transmittance of the observation filter over a second wavelength range,
wherein the second value is less than a third value, which represents the mean value of the transmittance of the observation filter over a third wavelength range,
wherein a fourth value, which represents the mean value of the intensity of the illumination light over the first wavelength range is larger than a fifth value, which represents the mean value of the intensity of the illumination light over the second wavelength range,
wherein the fifth value is larger than a sixth value, which represents the mean value of the intensity of the illumination light over the third wavelength range,
wherein the first, second and third wavelength ranges do not overlap one another and are in each case between 350 nm and 1000 nm,
wherein the first wavelength range includes wavelengths at which an absorption rate—normalized to their maximum value—of a fluorescent dye present in the object is at least 5%, and wherein the third wavelength range includes wavelengths at which an emission rate —normalized to their maximum value—of the fluorescent dye present in the object is at least 5%.

21. The microscopy method according to claim 20, wherein:
the first wavelength range includes the wavelength 405 nm, or wavelengths of from 390 nm to 420 nm,
the second wavelength range includes wavelengths from 450 nm to 600 nm, and
the third wavelength range includes wavelengths from 620 nm to 720 nm.

22. The microscopy method according to claim 20, wherein:
the first wavelength range includes wavelengths from 480 nm to 500 nm,
the second wavelength range includes wavelengths from 620 nm to 750 nm, and
the third wavelength range includes wavelengths from 550 nm to 600 nm.

23. The microscopy method according to claim 20, wherein:
a ratio of the first value to the second value is at most 1/100, and/or
a ratio of the second value to the third value is at most 0.9; and/or
wherein a ratio of the fourth value to the fifth value is at least 2, and/or
a ratio of the fourth value to the sixth value is at least 1000.

24. A microscopy method, comprising:
generating illumination light and directing illumination light onto an object;
generating an observation beam path, which images the object into an image plane, an observation filter being arranged in the observation beam path,
wherein a first value, which represents a mean value of the transmittance of the observation filter over a first wavelength range, is less than a second value, which represents the mean value of the transmittance of the observation filter over a second wavelength range,
wherein the second value is less than a third value, which represents the mean value of the transmittance of the observation filter over a third wavelength range,
wherein a fourth value, which represents the mean value of the intensity of the illumination light over the first wavelength range is larger than a fifth value, which represents the mean value of the intensity of the illumination light over the second wavelength range,
wherein the fifth value is larger than a sixth value, which represents the mean value of the intensity of the illumination light over the third wavelength range,
wherein the first, second and third wavelength ranges do not overlap one another and are in each case between 350 nm and 1000 nm, and
wherein the second wavelength range includes exclusively wavelengths at which an absorption rate—normalized to their maximum value—of a fluorescent dye present in the object is at most 20%, and at which an emission rate—normalized to their maximum value—of the fluorescent dye present in the object is at most 20%.

25. The microscopy method according to claim 24, wherein:
the first wavelength range includes the wavelength 405 nm, or wavelengths of from 390 nm to 420 nm,
the second wavelength range includes wavelengths from 450 nm to 600 nm, and
the third wavelength range includes wavelengths from 620 nm to 720 nm.

26. The microscopy method according to claim 24, wherein:
the first wavelength range includes wavelengths from 480 nm to 500 nm,
the second wavelength range includes wavelengths from 620 nm to 750 nm, and
the third wavelength range includes wavelengths from 550 nm to 600nm.

27. The microscopy method according to claim 24, wherein:
a ratio of the first value to the second value is at most 1/100, and/or
a ratio of the second value to the third value is at most 0.9; and/or
wherein a ratio of the fourth value to the fifth value is at least 2, and/or
a ratio of the fourth value to the sixth value is at least 1000.

28. A microscopy method, comprising:
generating illumination light and directing illumination light onto an object;
generating an observation beam path, which images the object into an image plane, an observation filter being arranged in the observation beam path,
wherein a first value, which represents a mean value of the transmittance of the observation filter over a first wavelength range, is less than a second value, which represents the mean value of the transmittance of the observation filter over a second wavelength range,
wherein the second value is less than a third value, which represents the mean value of the transmittance of the observation filter over a third wavelength range,
wherein a fourth value, which represents the mean value of the intensity of the illumination light over the first wavelength range is larger than a fifth value, which represents the mean value of the intensity of the illumination light over the second wavelength range,
wherein the fifth value is larger than a sixth value, which represents the mean value of the intensity of the illumination light over the third wavelength range, wherein the first, second and third wavelength ranges do not overlap one another and are in each case between 350 nm and 1000 nm,
wherein the illumination light is generated with a plurality of narrowband light sources,
wherein at least one of the light sources generates light having wavelengths in the first wavelength range, and
wherein at least one of the light sources generates the light having wavelengths in the second wavelength range.

29. The microscopy method according to claim 28, wherein the light sources generate substantially no light with wavelengths in the third wavelength range.

30. The microscopy method according to claim 28, wherein:
the first wavelength range includes the wavelength 405 nm, or wavelengths of from 390 nm to 420 nm,
the second wavelength range includes wavelengths from 450 nm to 600 nm, and
the third wavelength range includes wavelengths from 620 nm to 720 nm.

31. The microscopy method according to claim 28, wherein:

the first wavelength range includes wavelengths from 480 nm to 500 nm, the second wavelength range includes wavelengths from 620 nm to 750 nm, and the third wavelength range includes wavelengths from 550 nm to 600 nm.

32. The microscopy method according to claim 28, wherein:

a ratio of the first value to the second value is at most 1/100, and/or a ratio of the second value to the third value is at most 0.9; and/or wherein a ratio of the fourth value to the fifth value is at least 2, and/or a ratio of the fourth value to the sixth value is at least 1000.

33. A microscopy method, comprising:

generating illumination light and directing illumination light onto an object;

generating an observation beam path, which images the object into an image plane;

generating the illumination light such that a ratio of a first characteristic value to a second characteristic value has a value in the range of 20/1 to 1/20;

the first characteristic value being a value of a characteristic variable for the intensity of light of the observation beam path at first locations in the image plane, at which the first locations color valences of light of the observation beam path lie within a first color valence range of a color space; and the second characteristic value being a value of the characteristic variable for the intensity of light of the observation beam path at second locations in the image plane, at which second locations the color valences of light of the observation beam path lie within a second color valence range of the color space, wherein the first characteristic value represents a maximum value or a mean value of the intensity of light of the observation beam path at the first locations, and wherein the second characteristic value represents a maximum value or the mean value of the intensity of the light of the observation beam path at the second locations.

34. A microscopy method, comprising:

generating illumination light and directing illumination light onto an object;

generating an observation beam path, which images the object into an image plane;

generating the illumination light such that a ratio of a first characteristic value to a second characteristic value has a value in the range of 20/1 to 1/20;

the first characteristic value being a value of a characteristic variable for the intensity of light of the observation beam path at first locations in the image plane, at which the first locations color valences of light of the observation beam path lie within a first color valence range of a color space;

the second characteristic value being a value of the characteristic variable for the intensity of light of the observation beam path at second locations in the image plane, at which second locations the color valences of light of the observation beam path lie within a second color valence range of the color space;

determining the first locations in the image plane at which the color valences of light of the observation beam path lie within the first color valence range of the color space;

determining the second locations in the image plane at which the color valences of the light of the observation beam path lie within the second color valence range of the color space; and generating the illumination light depending on the intensity of the light of the observation beam path at the first locations determined and depending on the intensity of the light of the observation beam path at the second locations determined.

35. The microscopy method according to claim 34, further comprising:

recording an image of the object in the image plane, the image including a plurality of image points;

comparing color valences at image points of the image with the first color valence range and/or with the second color valence range;

determining first image points from the plurality of image points based on a result of a comparison, first image points corresponding to the first locations in the image plane and the color valences at the first image points lying within the first color valence range of the color space; and determining second image points from the plurality of image points based on a result of the comparison, the second image points corresponding to the second locations in the image plane and the color valences at the second image points lying within the second color valence range of the color space.

36. The microscopy method according to claim 34, further comprising:

determining the first characteristic value based on the intensity of the light of the observation beam path at the first locations; and determining the second characteristic value based on the intensity of the light of the observation beam path at the second locations; and generating the illumination light depending on the first characteristic value and depending on the second characteristic value.

37. A microscopy method, comprising:

generating illumination light and directing illumination light onto an object;

generating an observation beam path, which images the object into an image plane;

generating the illumination light such that a ratio of a first characteristic value to a second characteristic value has a value in the range of 20/1 to 1/20;

the first characteristic value being a value of a characteristic variable for the intensity of light of the observation beam path at first locations in the image plane, at which the first locations color valences of light of the observation beam path lie within a first color valence range of a color space;

the second characteristic value being a value of the characteristic variable for the intensity of light of the observation beam path at second locations in the image plane, at which second locations the color valences of light of the observation beam path lie within a second color valence range of the color space;

generating the illumination light by a plurality of light sources which generate light in different wavelength ranges, and wherein the generating of the illumination light comprises:

setting or varying an energy fed to at least one of the plurality of light sources for generating the illumination light, depending on the first and second characteristic values.

38. A microscopy method, comprising:
generating illumination light and directing illumination light onto an object;
generating an observation beam path, which images the object into an image plane;
generating the illumination light such that a ratio of a first characteristic value to a second characteristic value has a value in the range of 20/1 to 1/20;
the first characteristic value being a value of a characteristic variable for the intensity of light of the observation beam path at first locations in the image plane, at which the first locations color valences of light of the observation beam path lie within a first color valence range of a color space; and
the second characteristic value being a value of the characteristic variable for the intensity of light of the observation beam path at second locations in the image plane, at which second locations the color valences of light of the observation beam path lie within a second color valence range of the color space,
wherein the first color valence range and the second color valence range do not overlap; and/or
wherein a smallest color difference between the first color valence range and the second color valence range in the CIE 1976 u'v' chromaticity diagram is at least 0.01.

39. A microscopy method, comprising:
generating illumination light and directing illumination light onto an object;
generating an observation beam path, which images the object into an image plane;
generating the illumination light such that a ratio of a first characteristic value to a second characteristic value has a value in the range of 20/1 to 1/20;
the first characteristic value being a value of a characteristic variable for the intensity of light of the observation beam path at first locations in the image plane, at which the first locations color valences of light of the observation beam path lie within a first color valence range of a color space;
the second characteristic value being a value of the characteristic variable for the intensity of light of the observation beam path at second locations in the image plane, at which second locations the color valences of light of the observation beam path lie within a second color valence range of the color space; and
limiting the first color valence range to the color valences which have a color difference of at most 0.1 with respect to reference color valences in the CIE 1976u'v' chromaticity diagram, the reference color valences corresponding to light in a reference wavelength range containing exclusively wavelengths at which an emission rate—normalized to their maximum value—of a fluorescent dye present in the object is at least 5%.

40. A microscopy method, comprising:
generating illumination light and directing illumination light onto an object;
generating an observation beam path, which images the object into an image plane;
generating the illumination light such that a ratio of a first characteristic value to a second characteristic value has a value in the range of 20/1 to 1/20;
the first characteristic value being a value of a characteristic variable for the intensity of light of the observation beam path at first locations in the image plane, at which the first locations color valences of light of the observation beam path lie within a first color valence range of a color space; and
the second characteristic value being a value of the characteristic variable for the intensity of light of the observation beam path at second locations in the image plane, at which second locations the color valences of light of the observation beam path lie within a second color valence range of the color space,
wherein the first color valence range includes a color valence which corresponds to light having a wavelength of 635 nm; and/or
wherein the method further comprises limiting the first color valence range to the color valences which have a color difference of at most 0.1 with respect to a reference color valence corresponding to light having a wavelength of 630 nm in the CIE 1976 u'v' chromaticity diagram.

41. A microscopy method, comprising:
generating illumination light and directing illumination light onto an object;
generating an observation beam path, which images the object into an image plane;
generating the illumination light such that a ratio of a first characteristic value to a second characteristic value has a value in the range of 20/1 to 1/20;
the first characteristic value being a value of a characteristic variable for the intensity of light of the observation beam path at first locations in the image plane, at which the first locations color valences of light of the observation beam path lie within a first color valence range of a color space; and
the second characteristic value being a value of the characteristic variable for the intensity of light of the observation beam path at second locations in the image plane, at which second locations the color valences of light of the observation beam path lie within a second color valence range of the color space,
wherein the first color valence range includes a color valence which corresponds to light having a wavelength of 530 nm; and/or
wherein the method further comprises limiting the first color valence range to the color valences which have a color difference of at most 0.1 with respect to a reference color valence corresponding to light having a wavelength of 530 nm in the CIE 1976 u'v' chromaticity diagram.

42. A microscopy method, comprising:
generating illumination light and directing illumination light onto an object;
generating an observation beam path, which images the object into an image plane;
generating the illumination light such that a ratio of a first characteristic value to a second characteristic value has a value in the range of 20/1 to 1/20;
the first characteristic value being a value of a characteristic variable for the intensity of light of the observation beam path at first locations in the image plane, at which the first locations color valences of light of the observation beam path lie within a first color valence range of a color space; and
the second characteristic value being a value of the characteristic variable for the intensity of light of the observation beam path at second locations in the image plane, at which second locations the color valences of light of the observation beam path lie within a second color valence range of the color space, wherein the first color valence range in the CIE 1976 u'v' chromaticity diagram includes a color valence having the coordinates u'=0.113 and v'=0.575 or having the coordinates u'=0.570 and v'=0.514, and/or wherein the second color valence range includes the white point D50 or D65.

43. A microscopy method, comprising:

generating illumination light and directing illumination light onto an object;

generating an observation beam path, which images the object into an image plane;

generating the illumination light such that a ratio of a first characteristic value to a second characteristic value has a value in the range of 20/1 to 1/20;

the first characteristic value being a value of a characteristic variable for the intensity of light of the observation beam path at first locations in the image plane, at which the first locations color valences of light of the observation beam path lie within a first color valence range of a color space;

the second characteristic value being a value of the characteristic variable for the intensity of light of the observation beam path at second locations in the image plane, at which second locations the color valences of light of the observation beam path lie within a second color valence range of the color space;

generating the illumination light independently of the intensity of light of the observation beam path at third locations in the image plane, and wherein the color valences of the light of the observation beam path at the third locations lie outside the first and second color valence ranges.

* * * * *

UNITED STATES PATENT AND TRADEMARK OFFICE
CERTIFICATE OF CORRECTION

PATENT NO. : 11,835,461 B2
APPLICATION NO. : 16/752610
DATED : December 5, 2023
INVENTOR(S) : Marco Wilzbach, Christoph Nieten and Stefan Meinkuss It is certified that error appears in the above-identified patent and that said Letters Patent is hereby corrected as shown below:

On the Title Page

Item (56) U.S. PATENT DOCUMENTS change:
"6,640,131 B1 10/2003 Trion et al." to "6,640,131 B1 10/2003 Irion et al."

In the Claims

For Claim 9:

In Column 28:
Line 13: Replace "$\lambda 3 < \lambda 3' < \lambda 4' < \lambda 4$ and 480" with "$\lambda 3 < \lambda 3' < \lambda 4' < \lambda 4$, 480"

In Column 28:
Line 14: Replace "nm $< \lambda 3' < 520$ nm and 520 nm $< \lambda 4' < 550$ nm and $\lambda 4'$-" with "nm $< \lambda 3' < 520$ nm, 520 nm $< \lambda 4' < 550$ nm, and $\lambda 4'$-"

For Claim 10:

In Column 28:
Line 32: Replace "$\lambda 7$ and $\lambda 8$ are wavelengths and $\lambda 4 < \lambda 7 < \lambda 8 < \lambda 5$ and 480" with "$\lambda 7$ and $\lambda 8$ are wavelengths, $\lambda 4 < \lambda 7 < \lambda 8 < \lambda 5$, 480"

In Column 28:
Line 33: Replace "nm $< \lambda 4 < 520$ nm and 520 nm $< \lambda 7 < 550$ nm and" with "nm $< \lambda 4 < 520$ nm, 520 nm $< \lambda 7 < 550$ nm,"

In Column 28:
Line 34: Replace "$\lambda 7 - \lambda 4 > 20$ nm and" with "$\lambda 7 - \lambda 4 > 20$ nm, and"

Signed and Sealed this
Fifth Day of November, 2024

Katherine Kelly Vidal
*Director of the United States Patent and Trademark Office*

CERTIFICATE OF CORRECTION (continued)
U.S. Pat. No. 11,835,461 B2

For Claim 11:

<u>In Column 28:</u>
Line 46: Replace "480 nm < λ4 < 520 nm and 530 nm < λ5 < 560 nm and" with "480 nm < λ4 < 520 nm, 530 nm < λ5 < 560 nm, and"

<u>In Column 28:</u>
Line 59: Replace "3 nm ≤ Δ ≤ 10 nm, λ5', λ6' are wavelengths and" with "3 nm ≤ Δ ≤ 10 nm, λ5', λ6' are wavelengths,"

<u>In Column 28:</u>
Line 60: Replace "λ4 < λ5' < λ6' < λ6, and 530 nm < λ5' < 570 nm and" with "λ4 < λ5' < λ6' < λ6, 530 nm < λ5' < 570 nm, and"

For Claim 13:

<u>In Column 29:</u>
Line 8: Replace "the object plane;" with "the object plane; and"

<u>In Column 29:</u>
Line 15: Replace "wavelengths and" with "wavelengths, and"

For Claim 14:

<u>In Column 29:</u>
Line 21: Replace "is less than W1," with "is less than W1, and"

For Claim 20:

<u>In Column 30:</u>
Line 41: Replace "light onto an object;" with "light onto an object; and"

For Claim 23:

<u>In Column 31:</u>
Line 26: Replace "0.9;" with "0.9,"

<u>In Column 31:</u>
Line 28: Replace "wherein a ratio of the fourth value" with "a ratio of the fourth value"

For Claim 24:

<u>In Column 31:</u>
Line 34: Replace "light onto an object;" with "light onto an object; and"

CERTIFICATE OF CORRECTION (continued)
U.S. Pat. No. 11,835,461 B2

For Claim 27:

In Column 32:
Line 18: Replace "0.9;" with "0.9,"

In Column 32:
Line 20: Replace "wherein a ratio of the fourth value" with "a ratio of the fourth value"

For Claim 28:

In Column 32:
Line 26: Replace "light onto an object;" with "light onto an object; and"

For Claim 43:

In Column 38:
Line 10: Replace "color valence range of the color space;" with "color valence range of the color space; and"

In Column 38:
Line 13: Replace "locations in the image plane, and" with "locations in the image plane,"